United States Patent
Ikeda et al.

(10) Patent No.: US 9,966,106 B2
(45) Date of Patent: May 8, 2018

(54) OPTICAL INFORMATION RECORDING DEVICE AND OPTICAL INFORMATION RECORDING METHOD

(71) Applicant: HITACHI CONSUMER ELECTRONICS CO., LTD., Yokohama-shi, Kanagawa (JP)

(72) Inventors: Masakazu Ikeda, Tokyo (JP); Jyunya Iizuka, Tokyo (JP); Yusuke Nakamura, Tokyo (JP)

(73) Assignee: Hitachi Consumer Electronics Co., Ltd., Kanagawa (JP)

( * ) Notice: Subject to any disclaimer, the term of this patent is extended or adjusted under 35 U.S.C. 154(b) by 0 days. days.

(21) Appl. No.: 15/552,504

(22) PCT Filed: Mar. 4, 2015

(86) PCT No.: PCT/JP2015/056278
§ 371 (c)(1),
(2) Date: Aug. 22, 2017

(87) PCT Pub. No.: WO2016/139765
PCT Pub. Date: Sep. 9, 2016

(65) Prior Publication Data
US 2018/0033461 A1    Feb. 1, 2018

(51) Int. Cl.
*G11B 7/00* (2006.01)
*G11B 20/18* (2006.01)
(Continued)

(52) U.S. Cl.
CPC ............ *G11B 20/18* (2013.01); *G11B 7/0065* (2013.01); *G03H 1/02* (2013.01); *G03H 1/0402* (2013.01);
(Continued)

(58) Field of Classification Search
CPC .... G11B 7/0065; G11B 7/083; G11B 7/00781
(Continued)

(56) References Cited

U.S. PATENT DOCUMENTS 9,208,035 B2 * 12/2015 Akahoshi ............ G06F 11/1474
2007/0047042 A1    3/2007 Noguchi
2014/0003221 A1    1/2014 Hoshizawa et al.

FOREIGN PATENT DOCUMENTS

JP    2007-060098 A    3/2007
JP    2007-066375 A    3/2007
(Continued)

OTHER PUBLICATIONS

International Search Report PCT/JP20151056278 dated May 26, 2015.

*Primary Examiner* — Nabil Hindi
(74) *Attorney, Agent, or Firm* — Mattingly & Malur, PC

(57) ABSTRACT

An error correction block generated by performing error correction coding to the user data is divided into b number of sectors (b: a natural number), each sector having a number of bits (a: a natural number), the sector is divided into c number of sub-sectors (c: a natural number) and bits are distributed to each of the c number of sub-sectors, arrangement order of the bits is randomized for each sub-sector to which the bits are distributed, the c number of sub-sectors in which the arrangement order of the bits is randomized are combined to generate an interleaved sector, the interleaved sector is divided into c/d (d: a natural number, c≠d, and c>d) and e number of divided interleaved sectors (e: a natural number, e≠b, and b>e) are combined to generate a pre-modulation block, which is modulated by a modulation rule.

12 Claims, 17 Drawing Sheets

(51) Int. Cl.
  *G11B 7/0065* (2006.01)
  *G03H 1/22* (2006.01)
  *G03H 1/02* (2006.01)
  *G03H 1/04* (2006.01)

(52) U.S. Cl.
  CPC ... *G03H 1/2202* (2013.01); *G03H 2001/0224* (2013.01); *G03H 2001/2244* (2013.01)

(58) Field of Classification Search
  USPC .......................................................... 369/103
  See application file for complete search history.

(56) References Cited

FOREIGN PATENT DOCUMENTS

| | | |
|---|---|---|
| JP | 2008-140485 A | 6/2008 |
| JP | 2014-010859 A | 1/2014 |
| WO | 2012/032612 A1 | 3/2012 |

\* cited by examiner

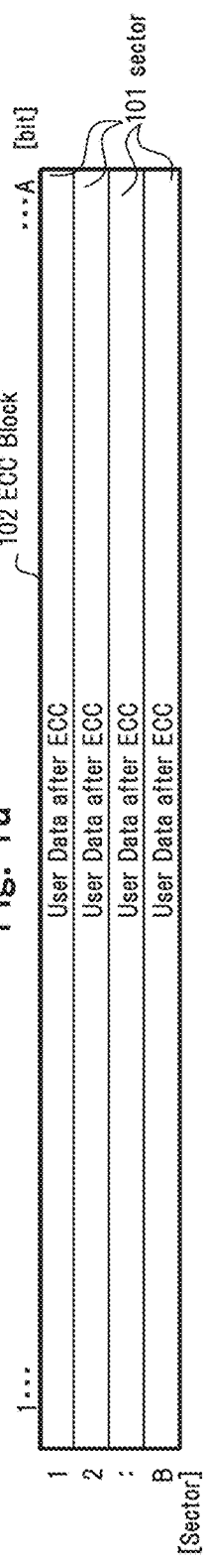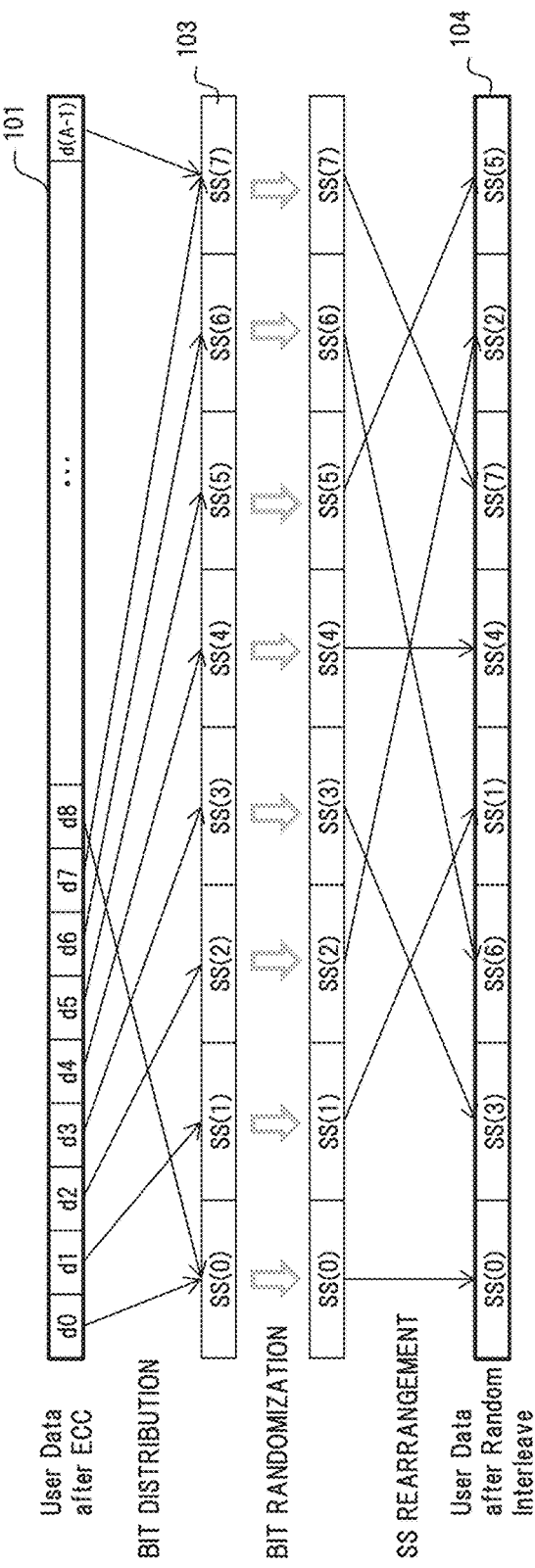

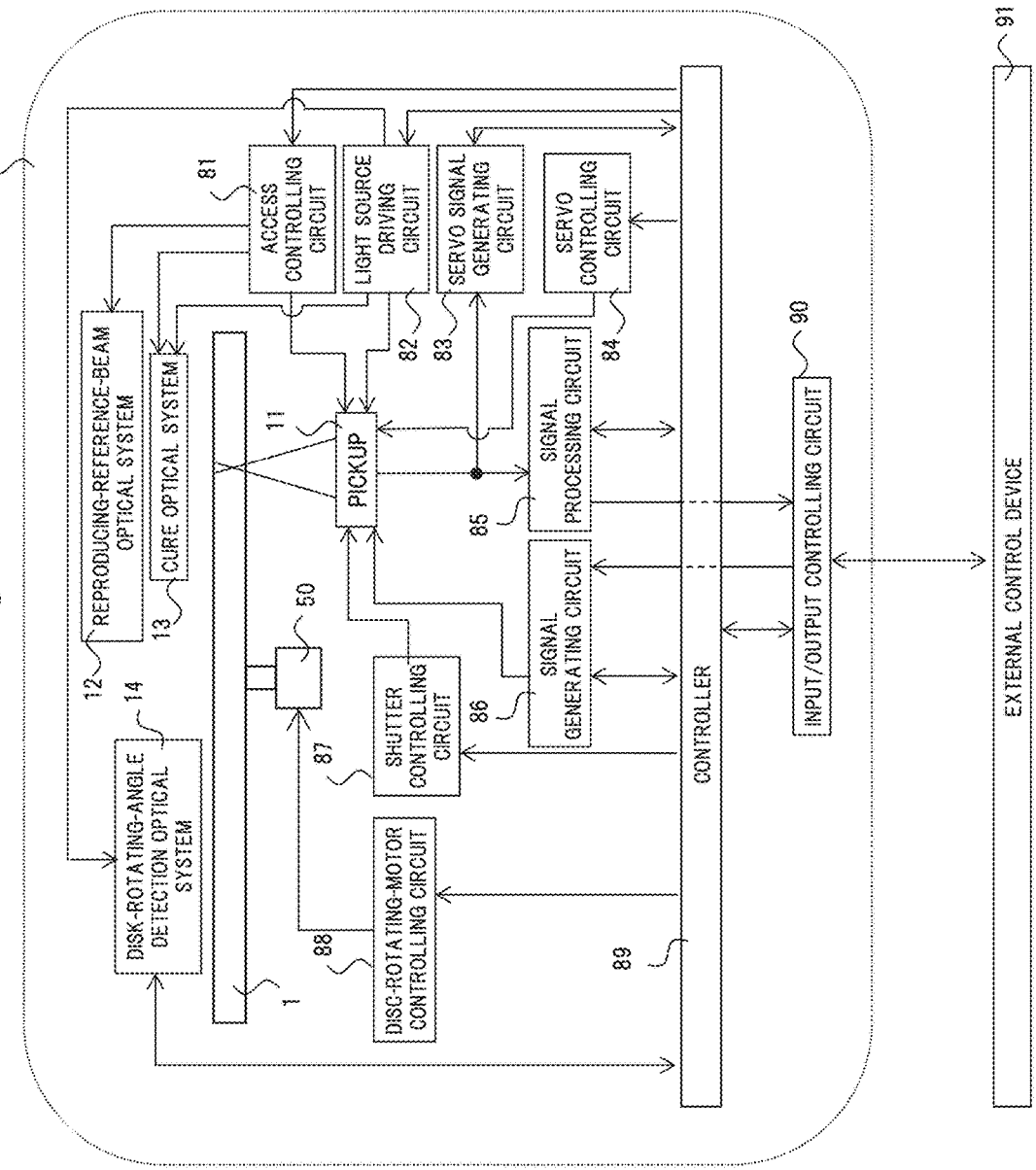

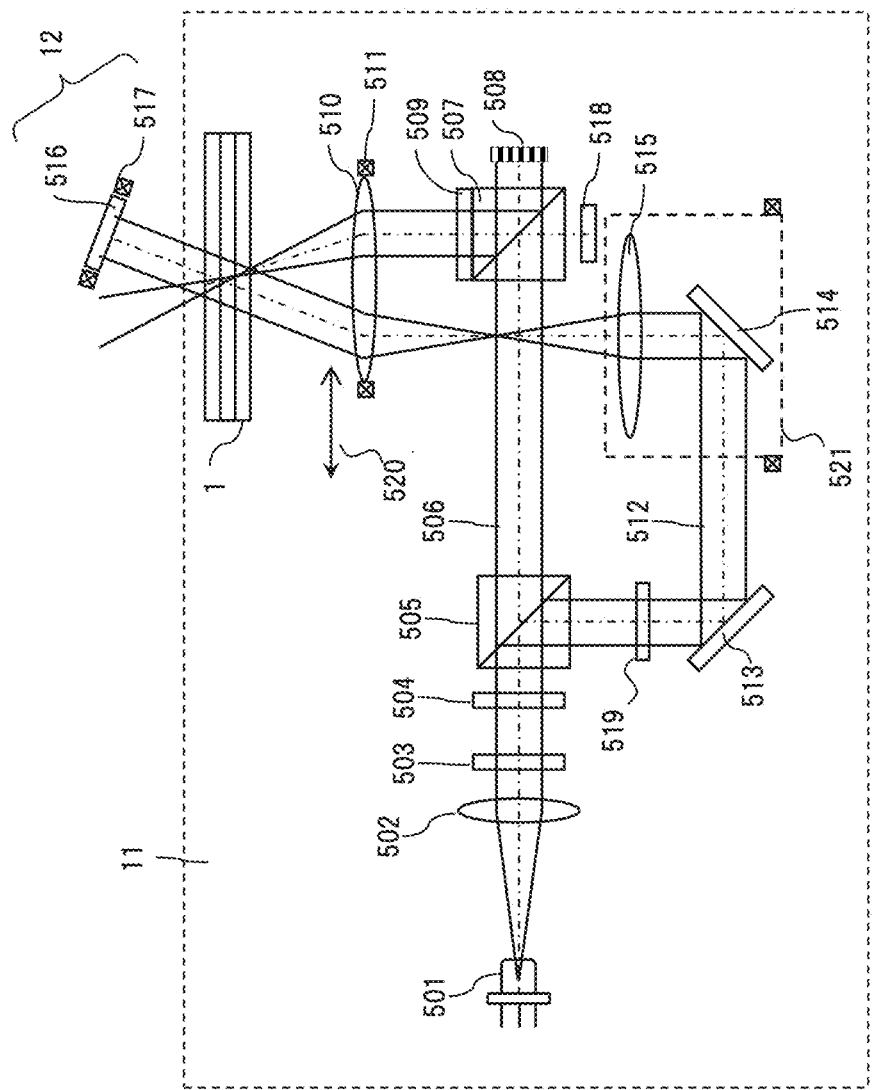

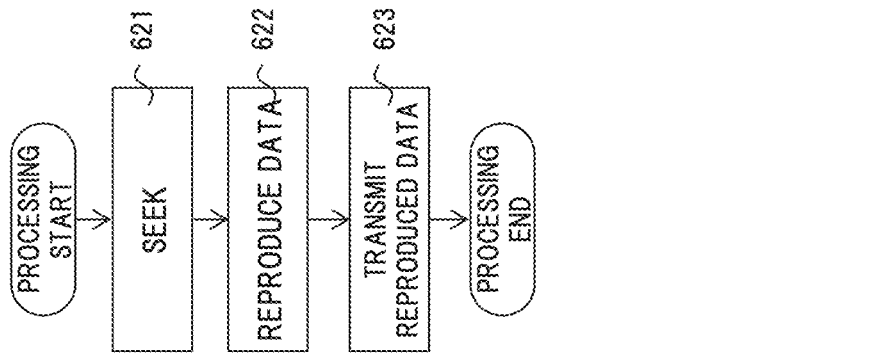
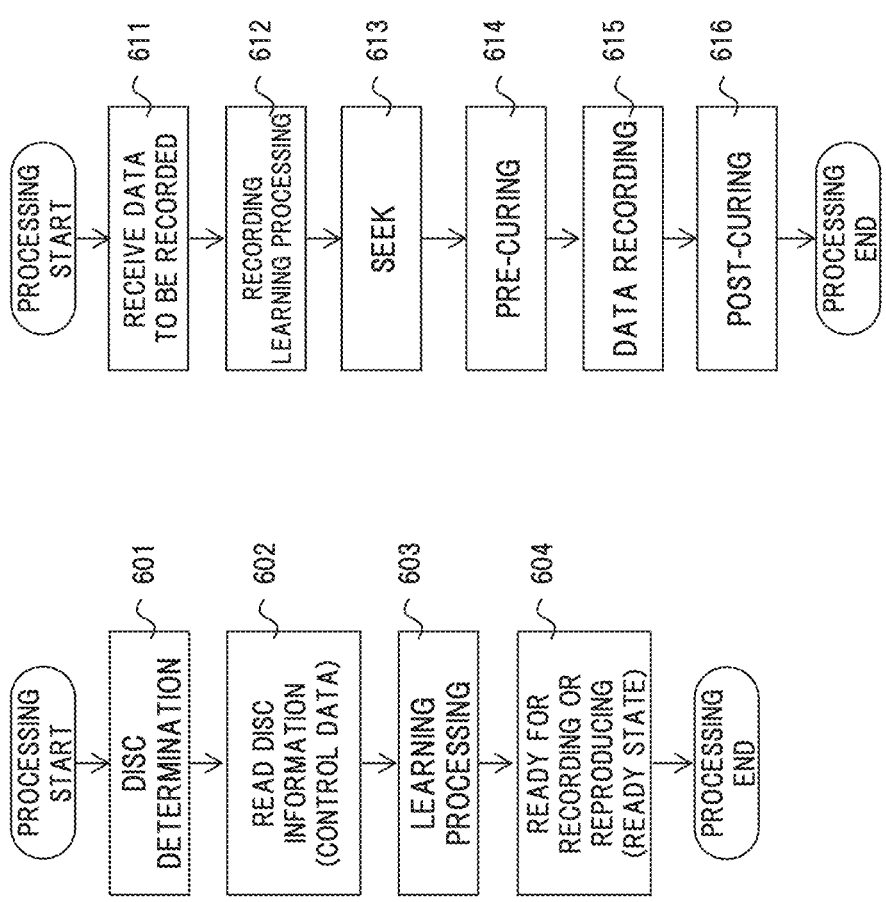

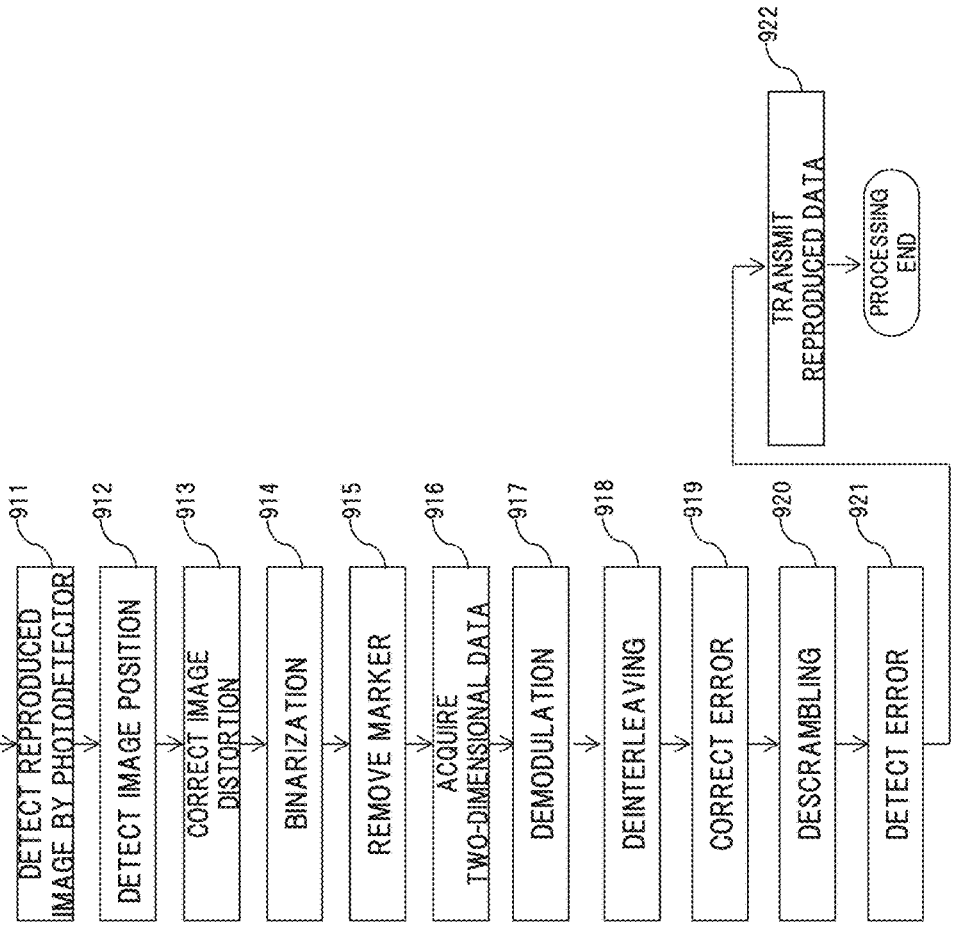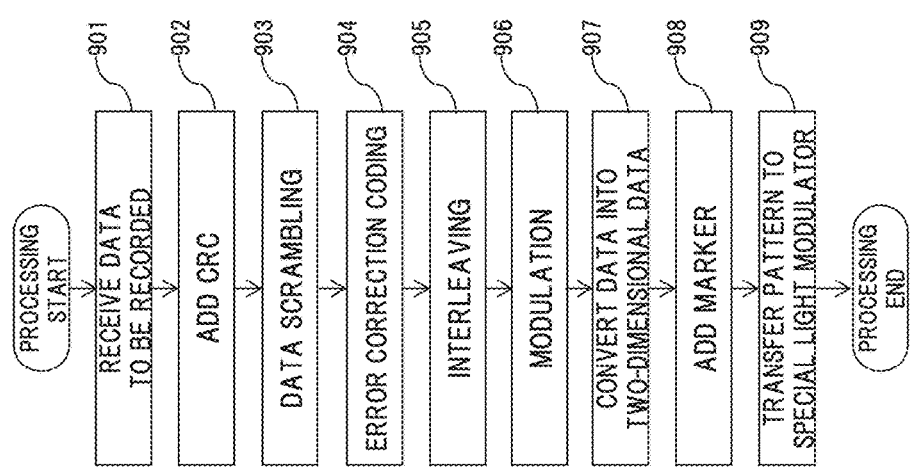

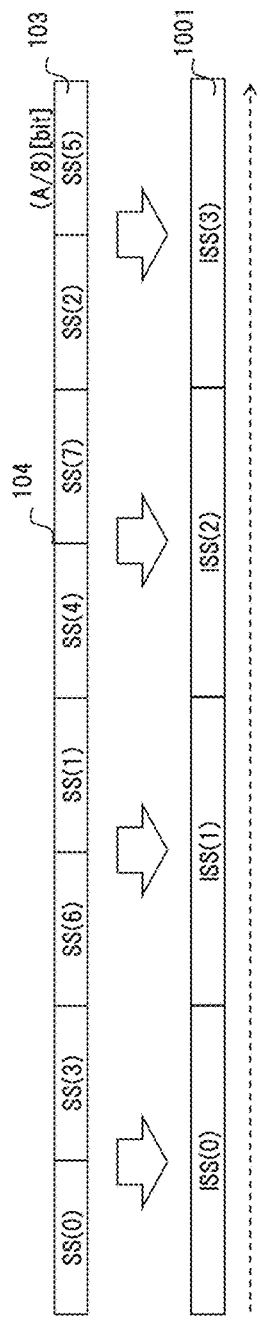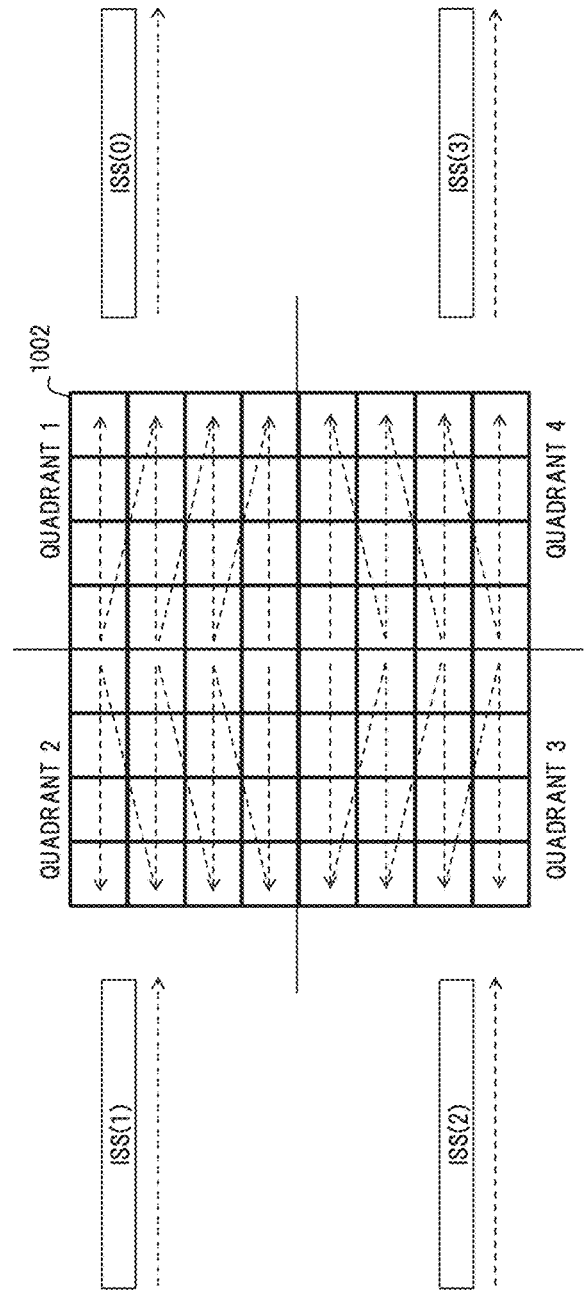

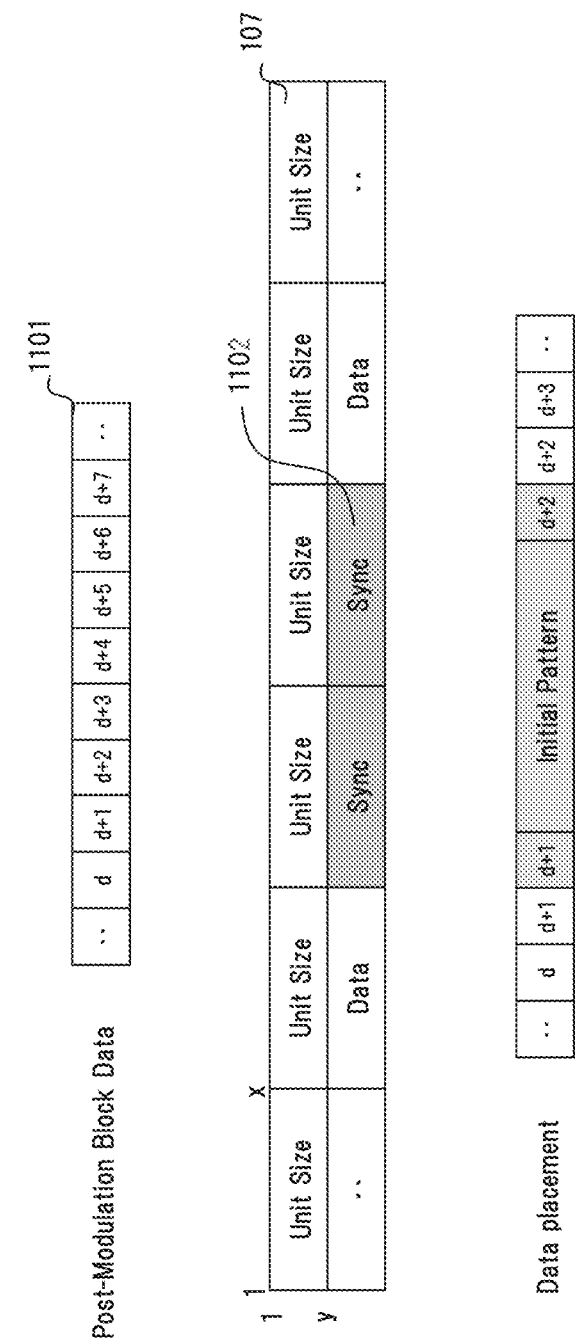

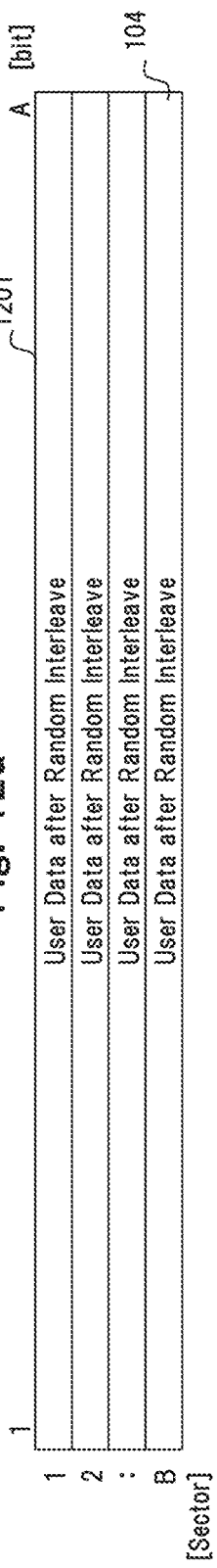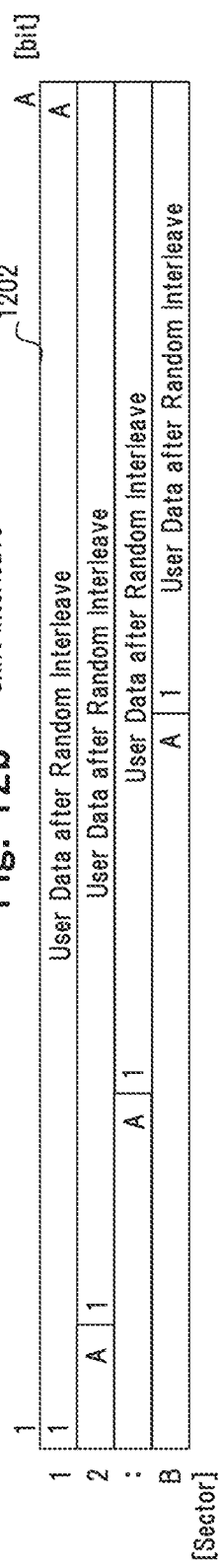

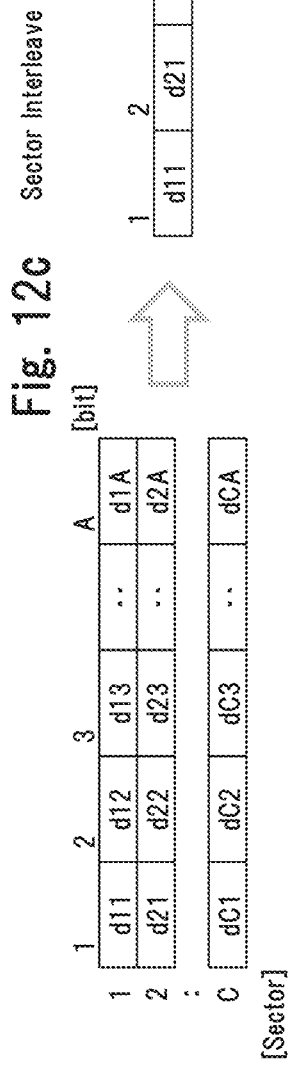
Fig. 12c  Sector Interleave
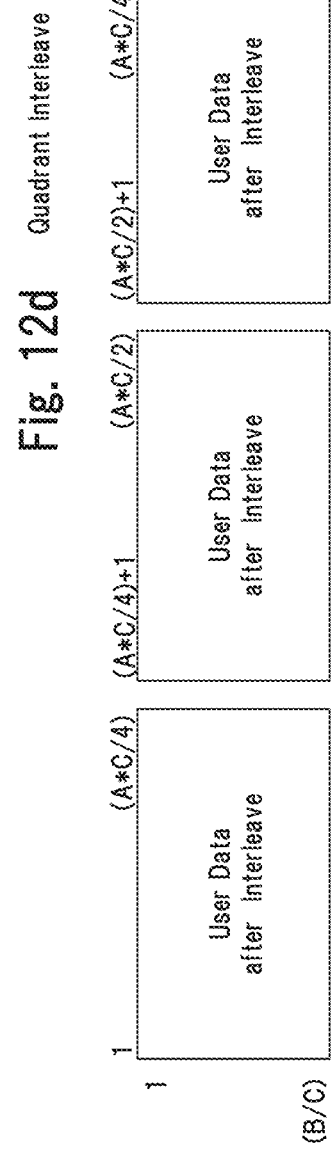
Fig. 12d  Quadrant Interleave

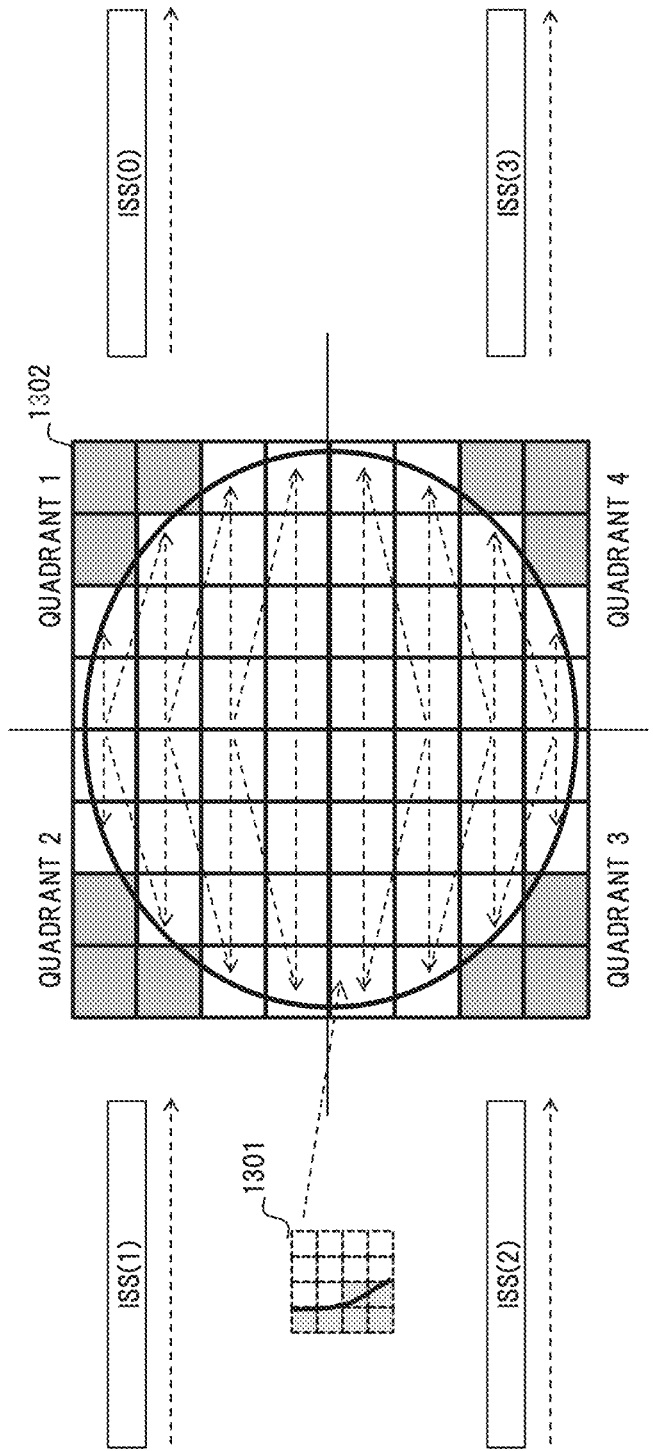

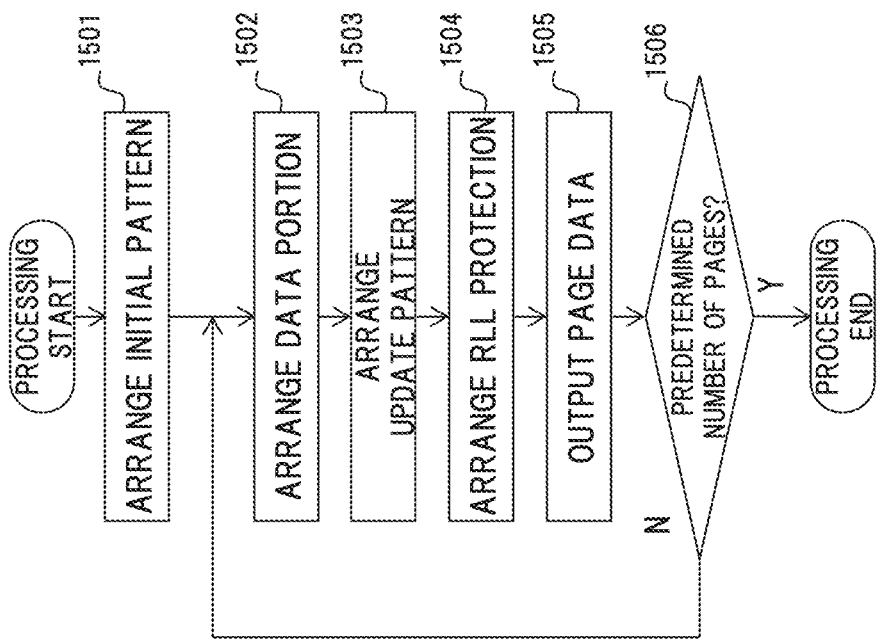

OPTICAL INFORMATION RECORDING DEVICE AND OPTICAL INFORMATION RECORDING METHOD

TECHNICAL FIELD

The present invention relates to a device and method for recording information in a recording medium using holography.

BACKGROUND ART

As a conventional technique, there is known, for example, JP 2008-140485 A (Patent Literature 1). This Literature states that "recorded data in one page is randomly arranged (interleaved) according to a predetermined agreement, and interleaved page data is recorded in a recording medium".

CITATION LIST

Patent Literature

Patent Literature 1: JP 2008-140485 A

SUMMARY OF INVENTION

Technical Problem

The interleaver described in Patent Literature 1 is reproducing means for outputting deinterleaved data in the output from the photodetector, and suppresses the increase in the memory and the reduction in the data rate.

However, if the arithmetic method of the interleaving is only simple rearrangement, it is easy to perform deinterleaving, but if as a method of interleaving at the time of recording, a complicated method is used to improve the performance of randomization or an arithmetic operation such as addition of a synchronization signal or modulation after the interleaving is performed, it is difficult to perform deinterleaving with a simple configuration because the arithmetic operation and configuration are complicated. Thus, it is necessary to take into consideration the acceleration of arithmetic operation processing itself at the time of recording or reproducing two-dimensional data.

For this reason, a purpose of the present invention is to provide an optical information recording device and an optical information recording method which generates two-dimensional data for achieving both ensuring of performance and acceleration of arithmetic operation processing time.

Solution to Problem

The above problem can be solved, for example, by the following configuration.

An optical information recording device which records information in an information recording medium using holography, the optical information recording device includes a signal generating unit which generates, from user data, two-dimensional data in which ON pixels and OFF pixels are arranged in a lattice shape, and a spatial light modulating unit which displays the generated two-dimensional data and spatially modulates a transmitted or reflected light beam, in which the signal generating unit divides an error correction block generated by performing error correction coding to the user data into b number of sectors (b: a natural number), each sector having a number of bits (a: a natural number), divides the sector into c number of sub-sectors (c: a natural number) and distributes bits to each of the c number of sub-sectors, randomizes arrangement order of the bits for each sub-sector to which the bits are distributed, combines the c number of sub-sectors in which the arrangement order of the bits is randomized to generate an interleaved sector, divides the interleaved sector into c/d (d: a natural number, c≠d, and c>d) and combines e number of divided interleaved sectors (e: a natural number, e≠b, and b>e) to generate a pre-modulation block, modulates the pre-modulation block by a modulation rule such that a lower limit value of the consecutive number of ON or OFF pixels arranged in a row direction among arrays of the pre-modulation block is to be f (f: a natural number) to generate a modulation string, and arranges the modulation string in a data unit of a sub-page generated by dividing predetermined page data into g (g: a natural number) and arranges a synchronization signal in a marker unit to generate the two-dimensional data, and the marker unit includes a fixed pattern indicating the synchronization signal and a copy pattern of adjacent codes of the modulation string.

Advantageous Effects of Invention

According to the present invention, a purpose is to provide an optical information recording device and an optical information recording method which generates two-dimensional data having a configuration capable of accelerating arithmetic operation processing time by processing arithmetic operation units in parallel while maintaining the performance of randomization.

BRIEF DESCRIPTION OF DRAWINGS

FIG. 1a is a diagram showing a configuration example of an ECC block according to the present embodiment.

FIG. 1b a diagram showing an example of random interleave processing according to the present embodiment.

FIG. 2 is a schematic diagram showing an example of an optical information recording/reproducing device according to the present embodiment.

FIG. 5 is a schematic diagram showing an example of the pickup in the optical information recording/reproducing device according to the present embodiment.

FIG. 6a is a flowchart showing an example of a preparation procedure before recording or reproducing of the optical information recording/reproducing device according to the present embodiment.

FIG. 6b is a flowchart showing an example of a recording procedure of the optical information recording/reproducing device according to the present embodiment.

FIG. 6c is a flowchart showing an example of a reproducing procedure of the optical information recording/reproducing device according to the present embodiment.

FIG. 9a is a flowchart schematically showing an example of an operational procedure of the signal generating circuit according to the present embodiment.

FIG. 9b is a flowchart schematically showing an example of an operational procedure of the signal processing circuit according to the present embodiment.

FIG. 10a is a diagram showing a configuration example of an interleaved sub-sector according to the present embodiment.

FIG. 10b is a diagram showing a configuration example of page data according to the present embodiment.

FIG. 11 is a schematic diagram showing an outline of sub-page recording data of the present embodiment.

FIG. 12a is a diagram showing an example of random interleave processing according to the present embodiment.

FIG. 12b is a diagram showing an example of shift interleave processing according to the present embodiment.

FIG. 12c is a diagram showing an example of inter-sector interleave processing according to the present embodiment.

FIG. 12d is a diagram showing an example of quadrant interleave processing according to the present embodiment.

FIG. 13 is a schematic diagram showing an outline of page recording data according to the present embodiment.

FIG. 15 is a flowchart showing an operational procedure of two-dimensional data pattern generation according to the present embodiment.

DESCRIPTION OF EMBODIMENTS

Figure 1C:
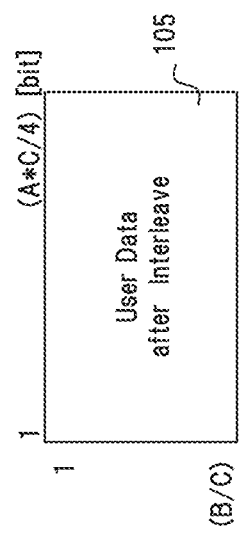
FIG. 1c is a diagram showing a configuration example of a pre-modulation data block according to the present embodiment.

Embodiments of the present invention will be described below with reference to the drawings.

First Embodiment

Embodiments of the present invention will be described with reference to the accompanying drawings. FIG. 2 is a block diagram showing a recording/reproducing device, which records or reproduces digital information using holography, for an optical information recording medium.

An optical information recording/reproducing device 10 is connected with an external control device 91 through an input/output controlling circuit 90. At the time of recording, the optical information recording/reproducing device 10 receives an information signal to be recorded from the external control device 91 thorough the input/output controlling circuit 90. At the time of reproducing, the optical information recording/reproducing device 10 transmits a reproduced information signal to the external control device 91 thorough the input/output controlling circuit 90.

The optical information recording/reproducing device 10 includes a pickup 11, a reproducing-reference-beam optical system 12, a cure optical system 13, a disk-rotating-angle detection optical system 14, and a rotating motor 50, and an optical information recording medium 1 is configured so as to be rotatable by the rotating motor 50.

The pickup 11 stores digital information in a recording medium using holography by irradiating the optical information recording medium 1 with a reference beam and a signal beam. At this time, the information signal to be recorded is transmitted to a spatial light modulator in the pickup 11 by a controller 89 through a signal generating circuit 86, and the signal beam is modulated by the spatial light modulator.

To reproduce information recorded in the optical information recording medium 1, the reproducing-reference-beam optical system 12 generates a light wave which causes the reference beam emitted from the pickup 11 to enter the optical information recording medium in a direction opposite to the direction at the time of recording. A photodetector, which will be described later, in the pickup 11 detects a reproduced beam to be reproduced by a reproducing reference beam, and a signal processing circuit 85 reproduces the signal.

The irradiation time of the optical information recording medium 1 irradiated with the reference beam and the signal beam irradiating can be adjusted by controlling the opening/closing time of a shutter in the pickup 11 by the controller 89 through a shutter controlling circuit 87.

The cure optical system 13 generates a light beam to be used for pre-curing and post-curing the optical information recording medium 1. The pre-curing is pre-processing in which a desired position of the optical information recording medium 1 is irradiated with a predetermined light beam before the desired position is irradiated with the reference beam and the signal beam to record information at the desired position. The post-curing is post-processing in which a desired position of the optical information recording medium 1 is irradiated with a predetermined light beam after information is recorded at the desired position not to add further information to the desired position.

The disk-rotating-angle detection optical system 14 detects the rotation angle of the optical information recording medium 1. In order to adjust the optical information recording medium 1 to a predetermined rotation angle, the disk-rotating-angle detection optical system 14 detects a signal according to the rotation angle, and the controller 89 controls, through a disc-rotating-motor controlling circuit 88, the rotation angle of the optical information recording medium 1 using the detected signal.

A light source driving circuit 82 provides predetermined light source driving current to light sources in the pickup 11, the cure optical system 13, and the disk-rotating-angle detection optical system 14, and each light source can emit a light beam with a predetermined amount of light.

Furthermore, the pickup 11, and the cure optical system 13 each have a mechanism for sliding its position in a radius direction of the optical information recording medium 1, and the position control is performed through an access controlling circuit 81.

Incidentally, a recording technique using the principle of angular multiplexing in holography tends to have an extremely small allowable error with respect to shift of a reference beam angle.

Thus, it is necessary to provide, in the pickup 11, a mechanism for detecting an amount of shift of a reference beam angle, generate a servo control signal by a servo signal generating circuit 83, and provide a servo mechanism for correcting the amount of shift through a servo controlling circuit 84 in the optical information recording/reproducing device 10.

Furthermore, some or all of the optical system configurations of the pickup 11, the cure optical system 13, and the disk-rotating-angle detection optical system 14 may be integrated for simplification.

Figure 3:
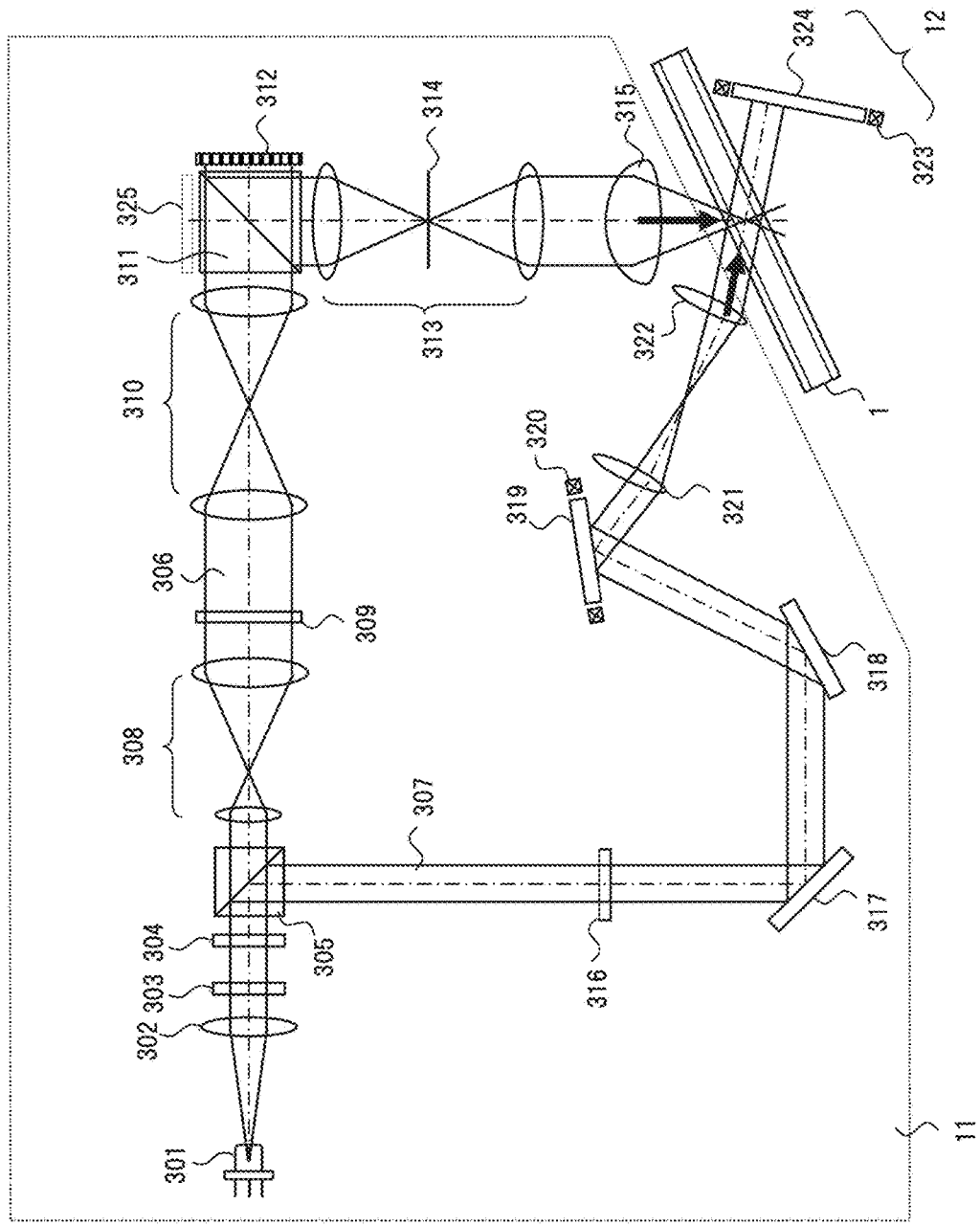
FIG. 3 is a schematic diagram showing an example of a pickup in the optical information recording/reproducing device according to the present embodiment.

FIG. 3 shows a recording principle in an example of a basic optical system configuration of the pickup 11 in the optical information recording/reproducing device 10. The light beam emitted from a light source 301 passes through a collimator lens 302 and enters a shutter 303. After the light beam passes through the shutter 303 when the shutter 303 is opened, the polarizing direction of the light beam is controlled by an optical element 304 constituted by, for example, a half-wave plate so that the ratio of the light amount of p-polarization and s-polarization is to be a desired ratio, and then the light beam enters a polarization beam splitter (PBS) prism 305.

The light beam passing through the PBS prism 305 serves as a signal beam 306, and the diameter of the light beam is expanded by a beam expander 308. Then, the light beam passes through a phase mask 309, a relay lens 310, and a PBS prism 311, and enters a spatial light modulator 312.

The signal beam to which information is added by the spatial light modulator 312 is reflected by the PBS prism 311, and propagates through a relay lens 313 and a spacial filter 314. Thereafter, the signal beam is condensed by an objective lens 315 on the optical information recording medium 1.

On the other hand, the light beam reflected by the PBS prism 305 serves as a reference beam 307, is set in a predetermined polarizing direction by a polarizing-direction conversion element 316 according to the time of recording or reproducing, passes through a mirror 317 and a mirror 318, and enters a galvanometer mirror 319. The angle of the galvanometer mirror 319 can be adjusted by an actuator 320, and the angle of incidence of the reference beam to pass through a lens 321 and a lens 322 and to enter the optical information recording medium 1 can be set at a desired angle. Note that, to set the angle of incidence of the reference beam, an element which converts the wavefront of the reference beam may be used instead of a galvanometer mirror.

By causing the signal beam and the reference beam to enter the optical information recording medium 1 so as to overlap each other, an interference pattern is formed in the recording medium, and the information is recorded by writing the pattern in the recording medium. Furthermore, since the angle of incidence of the reference beam to enter the optical information recording medium 1 can be changed by the galvanometer mirror 319, it is possible to perform recording by angular multiplexing.

Hereinafter, in holograms recorded by changing reference beam angles in the same region, a hologram corresponding to each individual reference beam angle is referred to as one page, and a set of pages recorded by angular multiplexing in the same region is referred to as a book.

Figure 4:
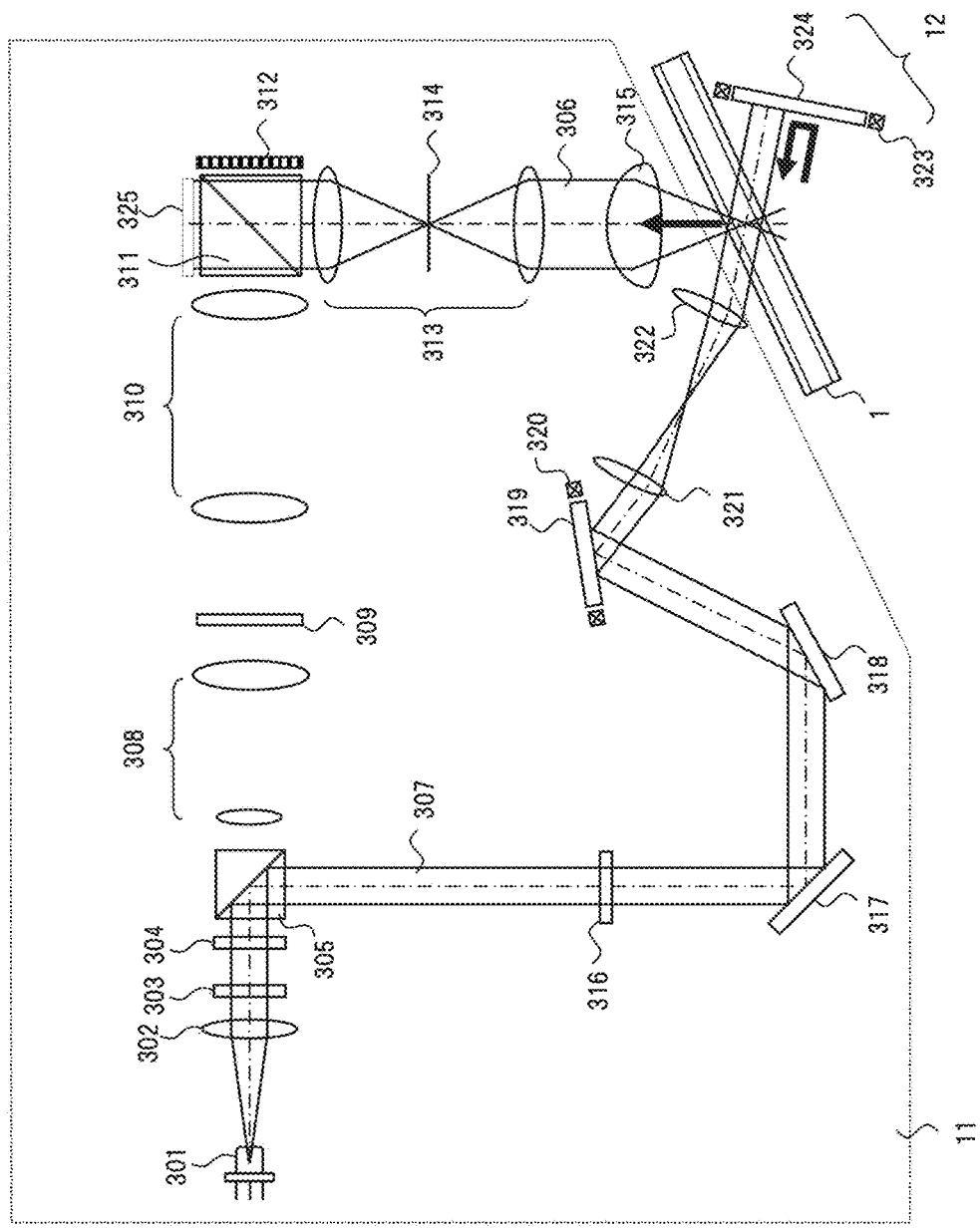
FIG. 4 is a schematic diagram showing an example of the pickup in the optical information recording/reproducing device according to the present embodiment.

FIG. 4 shows a reproducing principle in an example of a basic optical system configuration of the pickup 11 in the optical information recording/reproducing device 10. To reproduce the recorded information, as described above, by causing the reference beam to enter the optical information recording medium 1 and the light beam passing through the optical information recording medium 1 to be reflected by a galvanometer mirror 324 the angle of which can be adjusted by an actuator 323, the reproducing reference beam is reproduced.

The reproduced beam reproduced by the reproducing reference beam propagates through the objective lens 315, the relay lens 313, and the spacial filter 314. Thereafter, the reproduced beam passes through the PBS prism 311 and enters a photodetector 325, and the recorded signal is reproduced. As the photodetector 325, an image sensor, such as a CMOS image sensor or a CCD image sensor, can be used, but any sensor may be used as long as it can reproduce page data.

FIG. 5 is a diagram showing another configuration of the pickup 11. In FIG. 5, a light beam emitted from a light source 501 passes through a collimator lens 502 and enters a shutter 503. After the light beam passes through the shutter 503 when the shutter 503 is opened, the polarizing direction of the light beam is controlled by an optical element 504 constituted by, for example, a half-wave plate so that the ratio of the light amount of p-polarization and s-polarization is to be a desired ratio, and then the light beam enters a PBS prism 505.

The light beam passing through the PBS prism 505 passes through a PBS prism 507 and enters a spatial light modulator 508. The signal beam 506 to which information is added by the spatial light modulator 508 is reflected by the PBS prism 507, and propagates through an angle filter 509 which allows only a light beam having a predetermined angle of incident to pass. Thereafter, the signal beam is condensed by an objective lens 510 on the optical information recording medium 1.

On the other hand, the light beam reflected by the PBS prism 505 serves as a reference beam 512, is set in a predetermined polarizing direction by a polarizing-direction conversion element 519 according to the time of recording or reproducing, passes through a mirror 513 and a mirror 514, and enters a lens 515. The lens 515 condenses the reference beam 512 on the back focus surface of the objective lens 510. The reference beam condensed on the back focus surface of the objective lens 510 becomes a parallel beam by the objective lens 510 and enters the optical information recording medium 1 again.

Here, the objective lens 510 or the optical block 521 can be driven, for example, in the direction indicated by the reference sign 520. Thus, the relative position relation between the objective lens 510 and the focal point on the back focus surface of the objective lens 510 is changed by shifting the position of the objective lens 510 or the optical block 521 along the driving direction 520, and the angle of incident of the reference beam to enter the optical information recording medium 1 can be set at a desired angle. Note that, the angle of incident of the reference beam may be set at a desired angle by driving the mirror 514 by an actuator instead of driving the objective lens 510 or the optical block 521.

By causing the signal beam and the reference beam to enter the optical information recording medium 1 so as to overlap each other, an interference pattern is formed in the recording medium, and the information is recorded by writing the pattern in the recording medium. Furthermore, by shifting the position of the objective lens 510 or the optical block 521 along the driving direction 520, the angle of incident of the reference beam to enter the optical information recording medium 1 can be changed, and it is possible to perform recording by angular multiplexing.

To reproduce the recorded information, as described above, by causing the reference beam to enter the optical information recording medium 1 and the light beam passing through the optical information recording medium 1 to be reflected by a galvanometer mirror 516, the reproducing reference beam is reproduced. The reproduced beam reproduced by the reproducing reference beam propagates through the objective lens 510 and the angle filter 509. Thereafter, the reproduced beam passes through the PBS prism 507 and enters a photodetector 518, and the recorded signal is reproduced.

The optical system shown in FIG. 5 has the configuration causing the signal beam and the reference beam to enter the same objective lens, and has the advantage that it can be considerably downsized compared with the optical system configuration shown in FIG. 3.

FIGS. 6a to 6c show operational procedures of recording and reproducing in the optical information recording/reproducing device 10. Here, procedures especially related to recording and reproducing using holography are described.

FIG. 6a shows an operational procedure from insertion of the optical information recording medium 1 to the optical information recording/reproducing device 10 until recording or reproducing is ready. FIG. 6b shows an operational procedure from a ready state until information is recorded in the optical information recording medium 1. FIG. 6c shows an operational procedure from a ready state until the information recorded in the optical information recording medium 1 is reproduced.

As shown in FIG. 6a, when a medium is inserted, the optical information recording/reproducing device 10 performs disc determination as to whether, for example, the inserted medium is a medium in which digital information is recorded or reproduced by using holography (601).

As a result of the disc determination, when determining that the medium is an optical information recording medium in which digital information is recorded or reproduced using holography, the optical information recording/reproducing device 10 reads control data in the optical information recording medium (602), to acquire, for example information on the optical information recording medium and information related to various setting conditions in, for example, recording or reproducing.

After reading the control data, by performing various types of adjustment according to the control data or learning processing related to the pickup 11 (603), the optical information recording/reproducing device 10 is ready for recording or reproducing (604).

In the operational procedure from the ready state until the information is recorded, as shown in FIG. 6b, first, data to be recorded is received (611), and the information corresponding to the data is transmitted to the spatial light modulator 312 in the pickup 11.

Thereafter, in order to record information in the optical information recording medium with high quality, various types of recording learning processing, such as the power optimization of the light source 301 or exposure time optimization by the shutter 303, is performed in advance (612).

Then, in a seek operation (613), the access controlling circuit 81 is controlled so that the pickup 11 and the cure optical system 13 are positioned at predetermined positions of the optical information recording medium. When the optical information recording medium 1 has address information, the address information is reproduced to confirm whether the pickup 11 and the cure optical system 13 are positioned at the predetermined positions. If the pickup 11 and the cure optical system 13 are not positioned at the predetermined positions, the amount of shift from each predetermined position is calculated and the positioning operation is repeated.

Thereafter, a predetermined region is pre-cured using the light beam emitted from the cure optical system 13 (614), and the data is recorded using the reference beam and signal beam emitted from the pickup 11 (615).

After the data is recorded, the post-curing is performed using the light beam emitted from the cure optical system 13 (616). The data may be verified as needed.

In the operational procedure from the ready state until the recorded information is reproduced, as shown in FIG. 6c, first, the access controlling circuit 81 is controlled so that the pickup 11 and the reproducing-reference-beam optical system 12 are positioned at the predetermined positions of the optical information recording medium in the seek operation (621). When the optical information recording medium 1 has address information, the address information is reproduced to confirm whether the pickup 11 and the cure optical system 13 are positioned at the predetermined positions. If the pickup 11 and the cure optical system 13 are not positioned at the predetermined positions, the amount of shift from each predetermined position is calculated and the positioning operation is repeated.

Thereafter, the pickup 11 emits the reference beam to read the information recorded in the optical information recording medium (622), and the reproduced data is transmitted (623).

Figure 7:
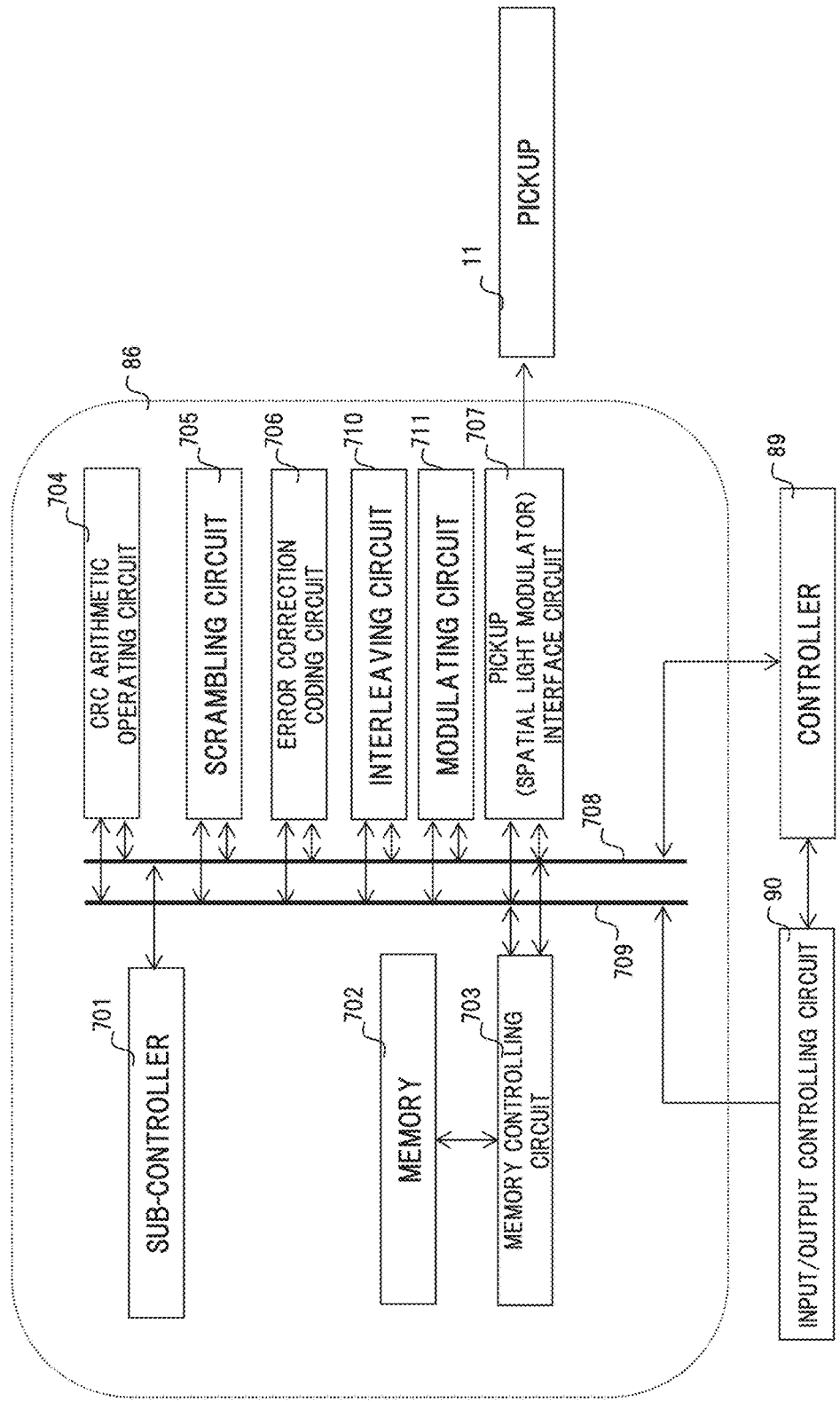
FIG. 7 is a schematic diagram showing an example of a signal generating circuit in the optical information recording/reproducing device according to the present embodiment.

FIG. 7 is a block diagram of the signal generating circuit 86 of the optical information recording/reproducing device 10.

When input of the user data to the input/output controlling circuit 90 is started, the input/output controlling circuit 90 notifies the controller 89 that the input of the user data has been started. The controller 89 controls, in response to the notification, the signal generating circuit 86 to record one page of data input from the input/output controlling circuit 90. The processing instruction from the controller 89 is notified to a sub-controller 701 in the signal generating circuit 86 through a control line 708. The sub-controller 701 controls, in response to the notification, the signal processing circuits through the control line 708 so that the signal processing circuits operate in parallel.

First, a memory controlling circuit 703 is controlled so as to store, in a memory 702, the user data input from the input/output controlling circuit 90 through a data line 709. When the user data stored in the memory 702 reaches a certain amount, a cyclic redundancy check (CRC) arithmetic operating circuit 704 CRC-codes the user data.

Next, a scrambling circuit 705 performs, to the CRC-coded data, scrambling in which pseudo random number data string is added, and an error correction coding circuit 706 performs error correction coding in which the parity data string is added. Then, an interleaving circuit 710 performs rearrangement, and a modulating circuit 711 performs modulation. Finally, a pickup interface circuit 707 reads the modulated data from the memory 702 in the order of the two-dimensional data on the spatial light modulator 312, adds a marker serving as a reference at the time of reproducing, and then transfers the two-dimensional data to the spatial light modulator 312 in the pickup 11.

In the two-dimensional data, a plurality of pixels is arrayed in a lattice shape, and the data is expressed by a pixel having high brightness (white) and a pixel having low brightness (black). Hereinafter, the pixel having high brightness is referred to as an ON pixel, and the pixel having low brightness is referred to as an OFF pixel.

Figure 8:
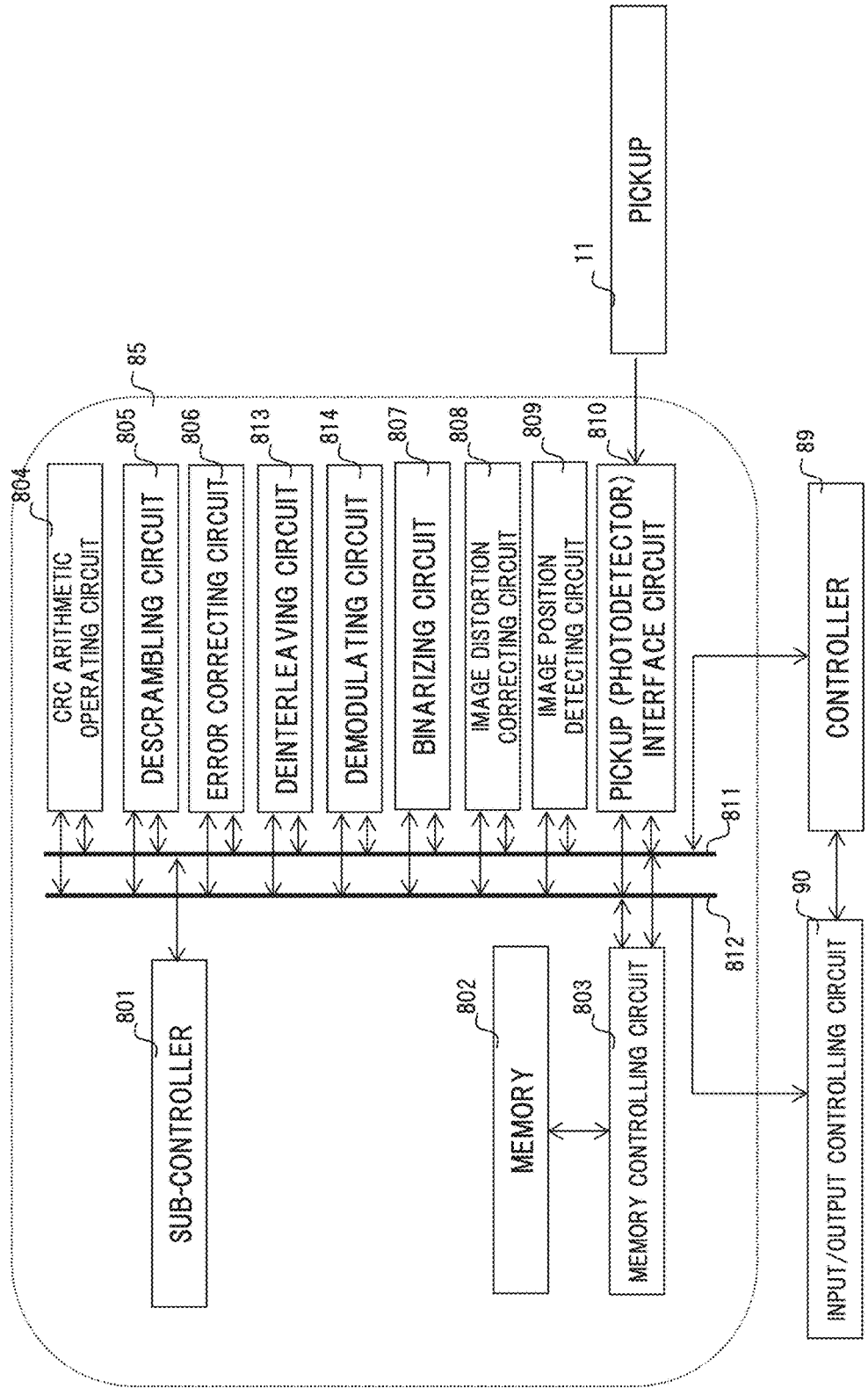
FIG. 8 is a schematic diagram showing an example of a signal processing circuit in the optical information recording/reproducing device according to the present embodiment.

FIG. 8 is a block diagram of the signal processing circuit 85 of the optical information recording/reproducing device 10.

When the photodetector 325 in the pickup 11 detects image data, the controller 89 controls the signal processing circuit 85 to reproduce one page of data input from the pickup 11. The processing instruction from the controller 89 is notified to a sub-controller 801 in the signal processing circuit 85 through a control line 811. The sub-controller 801 controls, in response to the notification, the signal processing circuits through the control line 811 so that the signal processing circuits operate in parallel.

First, a memory controlling circuit 803 is controlled so as to store, through a data line 812, the image data input from the pickup 11 in a memory 802 through a pickup interface circuit 810. When the data stored in the memory 802 reaches a certain amount, an image position detecting circuit 809 detects the marker from the image data stored in the memory 802 to extract an effective data range.

Next, an image distortion correcting circuit 808 performs distortion correcting, such as inclination, magnification, distortion, and the like of the image, using the detected marker, and converts the image data to a desired two-dimensional data size. Each bit data of a plurality of bits constituting the two-dimensional data converted in size is binarized to "0", "1" by a binarizing circuit 807, and the data demodulated by a demodulating circuit 814 and interleaved to be rearranged by a deinterleaving circuit 813 is stored in the memory 802 in the order of the output of the reproduced data.

An error correcting circuit 806 corrects errors included in each data string, a descrambling circuit 805 cancels scrambling in which the pseudo random number data string is added, and then a CRC arithmetic operating circuit 804 confirms that no error is included in the user data in the memory 802. Thereafter, the user data is transferred from the memory 802 to the input/output controlling circuit 90.

FIGS. 9a to 9b show data processing procedures at the time of recording or reproducing. FIG. 9a shows a recording data processing procedure at the signal generating circuit 86 from recording data receiving processing 611 at the input/output controlling circuit 90 until the spatial light modulator 312 converts the data into two-dimensional data. FIG. 9b shows a reproduced data processing operation at the signal processing circuit 85 from detection of the two-dimensional data by the photodetector 325 until reproduction data transmitting processing 624 at the input/output controlling circuit 90.

With reference to FIG. 9a, data processing at the time of recording will be described. When the user data is received (901), the data is divided into a plurality data strings, and each data string is CRC-coded so that the CRC arithmetic operating circuit 704 can perform error detection at the time of reproducing (902). The scrambling circuit 705 performs scrambling in which the pseudo random number data string is added to the data string to prevent repetition of the same pattern by substantially equalizing the number of ON pixels to the number of OFF pixels (903), then the error correction coding circuit 706 performs error correction coding such as Reed-Solomon code to correct errors at the time of reproducing (904), and the interleaving circuit 710 rearranges the data by interleave processing (905).

Next, the modulating circuit 711 modulates the data string (906), and constitutes one page of two-dimensional data by converting the modulated data into M×N two-dimensional data and repeating the conversion for one page data (907). The pickup interface circuit 707 adds, to the two-dimensional data constituted in this manner, a marker serving as a reference in image position detection or image distortion correction at the time of reproducing (908), and transfers the data to the spatial light modulator 312 (909).

Next, with reference to FIG. 9b, the data processing procedure at the time of reproducing will be described. The image data detected by the photodetector 325 is transferred to the signal processing circuit 85 (911). The image position detecting circuit 809 detects the image position by referring to the marker included in the image data input through the pickup interface circuit 810 (912), the image distortion correcting circuit 808 corrects the inclination, magnification, distortion, or the like of the image (913), and then the binarizing circuit 807 performs binarization processing (914), removes the marker (915), and acquires one page of two-dimensional data (916). The demodulating circuit 814 performs demodulation processing to the two-dimensional data obtained in this manner (917), the deinterleaving circuit 813 performs deinterleave processing to convert the data into a plurality of data strings (918), the error correcting circuit 806 performs error correction processing to remove the parity data string (919).

Next, the descrambling circuit 805 performs descrambling processing (920), the CRC arithmetic operating circuit 804 performs error detection processing by the CRC to delete the CRC parity (921), and then the user data is transmitted via the input/output controlling circuit 90 (922).

Here, the two-dimensional data generation processing after the interleave processing (905) will be described in detail. FIGS. 1a to 1d are schematic diagrams showing outlines of page recording data subjected to error correction coding (904) in the present embodiment.

FIG. 1a shows a configuration example of an error correction code (ECC) block 102. An ECC block 102 is constituted by B number of sectors (B: a natural number) when A-bit data (A: a natural number) to which an error correction code is added is one sector.

A sector 101 is generated by performing, to the received recording data, the CRC coding (902), the scrambling (903), and the error correction coding (904) at a predetermined coding rate.

FIG. 1b shows an example of a bit string randomized by an interleaving method. As shown in FIG. 1a, the generated sector 101 is divided into eight sub-sectors 103 (sub-sector: SS in the drawing). If the bit length of the sector 101 is not a multiple of 8, dummy bits or the like are added to easily handle the data.

Next, the bits constituting the sector 101 are allocated to the eight sub-sectors 103 into which the sector 101 is divided in the order of bit number from the first, and are randomized in each sub-sector 103 based on a rule different from each other. In the example of FIG. 1b, the first bit d0 of the sector 101 is arranged in SS(0), the second bit d1 is arranged in SS(1), . . . , the ninth bit d8 is arranged in SS(0), and the last bit d(A−1) is arranged in SS(7), and the arrangement order of the arranged (A/8) bits is randomized among the sub-sectors SS(0) to SS(7).

Thereafter, by rearranging the order of the sub-sectors and combining them, a random-interleaved sector 104 is constituted. In the example of FIG. 1b, the adjacent sub-sectors like the sub-sectors SS(0) and SS(1) are arranged with an interval of two sub-sectors. By rearranging the sub-sectors according to the rule shown in FIG. 1b, it is possible to ensure that the bits adjacently arranged in the bit string before the interleaving are separated with an interval of at least ((A/8)×2) bits or more, and thus it is possible to improve the performance of randomization.

In addition, it is possible to perform randomization independently for each sub-sector, and thus it is possible to easily perform processing in parallel at a high-speed.

In FIGS. 1a and 1b, it has been described the example in which the sub-sector 103 is constituted by dividing sector 101 into eight, but the number of divisions is not particularly limited thereto as long as the interval of the original bit string is ensured in the combined bit string.

FIG. 1c shows a configuration example of a block 105 before the modulation (906). As shown in FIG. 1b, a pre-modulation block 105 is constituted by combining and dividing a plurality of sectors of the user data subjected to the interleave processing. Here, C sectors (C: a natural number) are combined to constitute a block having (A×C) bits×(B/C) rows. The constituted block is divided into four to generate the pre-modulation block 105 having (A×C/4) bits×(B/C) rows.

Here, it is suitable if B number of sectors and C number of combined sectors satisfy that (B/C) is an integer. In the combining of C sectors, data bits may be extracted every bit from each sector, or the extraction start position may be changed for each sector. Although the pre-modulation block 105 is constituted by finally dividing the combined sector into four, the block may be any size which is easily handled at the time of arrangement on the two-dimensional page to easily perform arithmetic operation processing. Note that, when (B/C) is not an integer, it is possible to equalize processing units by adding dummy sectors to adjusting them.

Figure 1D:
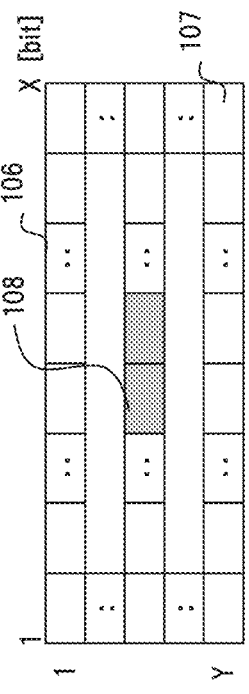
FIG. 1d is a schematic diagram showing an outline of page recording data according to the present embodiment.

FIG. 1*d* shows a configuration of a sub-page 106. By performing modulation processing (906) to the data of the pre-modulation block 105 generated as shown in FIG. 1*c*, a modulation string (post-modulation block) is generated and arranged on the sub-page 106.

The sub-page 106 is obtained by evenly dividing the data on one page into the size of X bits×Y rows (X and Y: natural numbers), and one page data is constituted by Z number of sub-pages (Z: a natural number) according to the page capacity and the data capacity of the page. One sub-page is constituted by a unit 107 having a predetermined size, and a marker unit 108 for detecting positional shift is arranged at, for example, the center unit position of the sub-page.

By arranging the pre-modulation block 105 generated in FIG. 1*c* at the position of the data unit 107 on the sub-page 106, two-dimensional data is generated. Thus, the size of the unit is suitable if (C×m/n) is an integer, X is an integral multiple of (C×m/n), and Y is an integral multiple of (B/C) based on the coding rate of modulation (m/n) (n-bit data is converted into m-bit data). When each data is not an integral multiple, the data is to be adjusted by combining a plurality of pieces of data or adding dummy data.

Here, with reference to FIGS. 10*a* and 10*b*, a two-dimensional data arranging method will be described in detail. FIG. 10*a* shows a configuration example of an interleaved sub-sector 1001. The sub-sector 1001 is generated by diving the combined eight sub-sectors 103 into four (consequently, combining the sub-sectors 103 by two) in the interleaved sector 104 shown in FIG. 1*b*. In other words, the interleaved sub-sector (ISS in the drawing) 1001 is the data constituting each row of the pre-modulation block of FIG. 1*c*.

FIG. 10*b* shows a configuration example of a page data 1002. In FIG. 10*b*, the page data 1002 is divided into four quadrants, and the data of the interleaved sub-sector 1001 of FIG. 10*a* is arranged in the sub-page of each quadrant.

In the example of FIG. 10*b*, the page is divided into four and arranged in the quadrants. However, by setting the number of quadrants on the page and the number of divisions of the pre-modulation block 105 to be the same to easily perform data processing, it is possible to perform processing in parallel by dividing the page into units having a predetermined size in this manner, and to perform processing at a high speed.

By arranging the data as shown in FIG. 10*b*, it is possible to ensure that the bits adjacently arranged in the bit string before interleaving are arranged with an interval of a predetermined distance not only in the one-dimensional distance of the bit string but also in the two-dimensional distance on the page, and it is possible to improve the performance of randomization and the performance of error correction.

In the example of FIG. 10*a*, similarly to the example of FIG. 1*b*, the bit strings d0, d1, and d2 before interleaving are stored in SS(0), SS(1), SS(2) of the random-interleaved sub-sector 103, and stored in ISS(0), ISS(1), and ISS(3) on the interleaved sub-sector 1001 respectively. Since the ISSs are arranged in different quadrants from each other, and are the data arranged in regions having a distance two-dimensionally. Thus, if there are variations in brightness or local defects for each region on a page basis, it is possible to allocate the ISSs to the regions where the bits adjacently arranged in the bit string before interleaving are not continuous.

With reference to FIG. 11, the data arrangement on the sub-page 106 will be described in detail.

Here, in the modulation processing (906), a predetermined modulation rule that defines the lower limit number of consecutive ON/OFF pixels in the X direction is used. The modulation processing 906 is performed to the pre-modulation block 105 of FIG. 1*c*, and the bit strings are continuously arranged only in the data units 107 except the position of the marker unit 108 of FIG. 1*d*. In other words, with respect to the positions before and after the marker unit 108, the bit strings are arranged by simply skipping the unit at the position of the marker unit 108.

In the case where the bit strings are arranged by simply skipping the unit at the position of the marker unit 108 in this manner, if the bit strings of the modulated block data 1101 modulated so as to satisfy the lower limit number of the consecutive number are sequentially arranged in each data unit 107, the bits (d+1) and (d+2) are divided to be arranged. In other words, the modulation rule that defines the lower limit number of consecutive on/off pixels as two or more cannot be ensured before and after (d+1) and (d+2).

When modulation processing is performed to handle this problem in advance, it is necessary to perform not only modulation to the pre-modulation block of FIG. 1*c* but also modulation processing taking into consideration the arrangement position on the page data and the pattern to be added, and the modulation processing is to be complicated. For this reason, it is assumed that the marker unit 108 of, for example, a synchronization signal 1102 which constitutes the marker unit 108 is constituted by a fixed pattern indicating the synchronization signal and copy data of an adjacent pattern. With this configuration, it is easy to ensure the lower limit number of consecutive ON/OFF pixels in the data pattern before and after the marker unit 108.

In FIG. 11, the lower limit number of the consecutive number is defined as two or more, and the synchronization signal 1102 is described as a copy of the adjacent one bit. However, by performing the copy with a length ensuring the value of the continuous number, it is possible to easily cope with this matter. Thus, it is possible to sequentially arrange the modulated data in the data unit 107, and to easily handle the data and accelerate the processing.

According to the present embodiment, since the arrangement is easily performed evenly in the regions, if there are variations in brightness or local defects in each region at the time of reproducing, it is possible to disperse the errors and to improve the performance of correction. Furthermore, it is possible to perform processing in parallel by dividing processing units such as multiple block units and to easily constitute two-dimensional arrangement, and thus it is possible to perform processing at a high speed. Moreover, by constituting the marker pattern with the pattern including the copy of the adjacent code, it is possible to easily perform the arrangement satisfying the modulation rule without performing complicated arithmetic operation processing.

Second Embodiment

FIGS. 12a to 12d are schematic diagrams showing outlines of page recording data as the present example. In the present embodiment, as the difference from the first embodiment, details of the interleaving method will be described. A pre-modulation block data 105 is generated by performing various types of interleaving processing shown in FIGS. 12a to 12d to a random-interleaved sector 104.

FIG. 12a shows a configuration example of block data 1201 generated by performing random interleave processing. The random interleave processing is as shown in FIG. 1b, and the block data 1201 having A bits×B sectors is generated.

FIG. 12b shows a configuration example of block data 1202 generated by performing shift interleave processing. In the shift interleave processing, the block data 1202 is obtained by shifting the bit string of the random-interleaved sector 104 in the column direction.

FIG. 12c shows a configuration example of block data 1203 generated by performing inter-sector interleave processing. As shown in FIG. 12c, the block data 1203 having (A×C) bits×(B/C) rows is obtained by performing inter-sector interleaving in which one bit is extracted for each C sector in the B sector and combined. In FIG. 12c, each sector data is rearranged on a bit basis in the order of bit 1 of sector 1 (d11) and bit 1 of sector 2 (d21) such as bit 1 of sector C (dC1) and bit 2 of sector 1 (d12). FIG. 12d shows a configuration example of block data 1204 generated by performing quadrant interleave processing. The block data 1204 is constituted by dividing the data 1203 after inter-sector interleave processing shown in FIG. 12c into four. The data having (A*C) bits×(B/C) sectors generated after inter-sector interleave for each C sector in FIG. 12c is divided into four in the column direction (bit direction) to obtain quadrant-interleaved data. The block data 1204 obtained in this manner is constituted similarly to the pre-modulation block data 105 shown in FIG. 1c, and can be similarly processed by being arranged on the sub-page.

If various types of interleaving shown in FIGS. 12b to 12d is performed, the effect of the randomization in the sector shown in FIG. 1b is not deteriorated, and it is possible to perform randomization on the two-dimensional arrangement by further changing an arrangement rule for each sector. Thus, it is possible to disperse variations in brightness and local defects at the time of reproducing on the two-dimensional data to each region, and to further improve the performance of correction. Furthermore, it is possible to perform processing in parallel by dividing processing units such as multiple block units and to easily constitute two-dimensional arrangement, and thus it is possible to perform processing at a high speed.

Third Embodiment

FIG. 13 is a diagram showing a configuration example of page data 1302 of the present embodiment. The difference from FIG. 10b of the first embodiment is that the area constituting effective data of one page data is limited to a circular area adjacent to the light spot shape.

The interleaved sub-sector 1001 shown in FIG. 10a is divided and arranged on the sub-page of each quadrant of the page shown in FIG. 13. Here, the data on the page in which the circular portion inscribed in the light spot is handled as effective data is arranged, for example, only in the units of the circular inscribed portion of the constituting sub-page, that is, in the units except the hatching portion of the sub-page 1301 of FIG. 13.

As the arrangement method similarly to the description with reference to FIG. 11, when the data is arranged only in the data units 107, effective data units are defined in each sub-page and the data is arranged only in the effective data units. When a marker unit 108 is not included in the effective area of each sub-page, the effective area is constituted only by the data units.

Here, if there is a sub-page which does not include a marker unit, regularity of the arrangement order of the data and the insertion position of the marker unit cannot be obtained, which results in a complicated data arrangement rule. However, as described with reference to FIG. 11, instead of performing arithmetic operation taking into consideration the arrangement position of two-dimensional data and the pattern to be added in advance at the time of modulation processing, by constituting the marker unit by a copy of the adjacent code similarly to the description of FIG. 11, it is possible to perform arithmetic operation processing only with the block structure of the pre-modulation block without taking into consideration the insertion position of the additional pattern of a marker or the like at the time of the modulation processing, and to easily perform processing, and which is suitable for high speed processing.

Thus, in the case of the arrangement in a circular format, since the arrangement is easily performed evenly in the regions, if there are variations in brightness or local defects in each region at the time of reproducing, it is possible to disperse the errors and to improve the performance of correction. Furthermore, it is possible to perform processing in parallel by dividing processing units such as multiple block units and to easily constitute two-dimensional arrangement, and thus it is possible to perform processing at a high speed. Moreover, by constituting the marker pattern with the pattern including the copy of the adjacent code, it is possible to easily perform the arrangement satisfying the modulation rule without performing complicated arithmetic operation processing.

Fourth Embodiment

Figure 14:
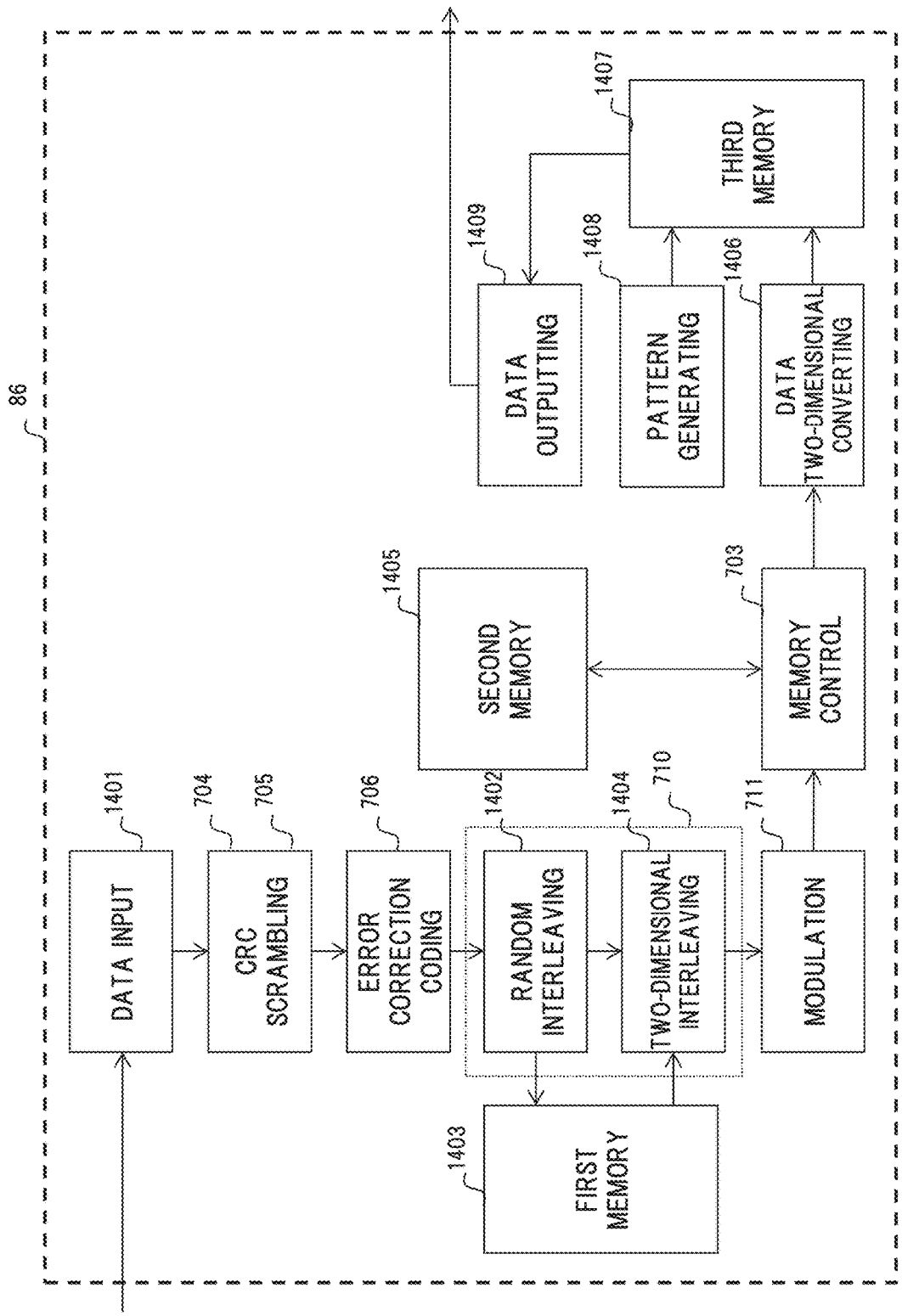
FIG. 14 is a schematic diagram showing details of a signal generating circuit according to the present embodiment.

FIG. 14 is a schematic diagram showing details of a signal generating circuit 86 of FIG. 2 in the present embodiment.

Data externally input via a data inputting circuit 1401 is processed by a CRC arithmetic operating circuit 704, a scrambling circuit 705, and an error correction coding circuit 706. Next, random interleaving as shown in FIG. 1b is performed.

A random interleaving circuit 1402 randomizes each sub-sector 103 and records the data in a first memory 1403. At this time, in order to record the randomized data in the first memory 1403, if the memory is divided into, for example, eight sub-sectors, the processing can be performed in parallel.

Next, the data can be read continuously or in parallel from the first memory 1403 to perform processing shown in FIG. 1c or FIGS. 12a to 12d at a two-dimensional interleaving circuit 1404. At this time, the first memory 1403 is implemented by, for example, a static random access memory (SRAM) and performs writing in parallel to the memory divided for each random interleave, and it is thereby possible to read consecutively or collectively in a certain unit the data arranged at continuous addresses from the memory storing the randomized data or to read in parallel the memory in the units into which the memory is divided for each quadrant eventually, and it is possible to easily perform processing at a high speed. In this case, since the randomized data is handled as continuous data, it is desirable to record, in the memory, and process the randomized data rather than the data before randomization.

Thereafter, a modulating circuit 711 performs modulation processing 906, and the data is recorded in a second memory 1405 via a memory controlling circuit 703. The second memory 1405 can store the modulated data block in units of a plurality of pages. At this time, the second memory 1405 is constituted by, for example, a dynamic random access memory (DRAM) to record a large amount of data.

Furthermore, the data is rearranged two-dimensionally in page units in a third memory 1407 to output externally. The modulated data in the second memory 1405 is arranged at the position of the data unit 107 via a data two-dimensional converting circuit 1406, and a pattern generating circuit 1408 generates a pattern such as a marker pattern and arranges the pattern at the position of a marker unit 108 in the third memory 1407. The third memory 1407 processes memory access at the time of recording and reproduction at a high speed by being implemented by, for example, an SRAM, similarly to the first memory 1403. The data in which the two-dimensional data is generated is output externally via a data outputting circuit 1409 and recorded as a hologram.

Here, details of the data generation method in the third memory 1407 are shown in FIG. 15. As described with reference to FIG. 11, a fixed pattern such as a marker on page data is constituted by a specific pattern and a copy of the adjacent bits, and most of the patterns have similar positions and patterns in each page. Thus, in the third memory 1407, a fixed pattern such as a marker pattern is arranged as an initial pattern (1501).

Next, the modulated data generated in the second memory 1405 is arranged in the third memory 1407 via the memory controlling circuit 703 and the data two-dimensional converting circuit 1406 (1502), and the pattern is differently rewritten for each page (1503). A pattern is to be updated in the case when there is a pattern such as a header having a page number for each page and the pattern differs from the pattern prepared as an initial pattern.

In the above description, the marker pattern has been only described, but a header pattern having page information, a synchronization pattern for detecting a positional shift in a page unit, and a synchronization pattern for detecting a positional shift for each sub-page as described in FIG. 11, and a pattern indicating a boundary with an effective data portion are also applicable to the page data. As long as any pattern is constituted by a fixed pattern for performing a desired operation and a copy of adjacent bits for satisfying the modulation rule of the portion adjacent to a data portion, it is not necessary to take into consideration the pattern at the time of arithmetic operation of modulation processing, and it is possible to achieve the function similarly to the marker by arranging the data skipping the arrangement position of a marker pattern or the like to protect the adjacent bits later.

The copy processing as described above to the data in the third memory 1407 in which the modulated data pattern and the update pattern are arranged. Since the storage position of the specific pattern is known, data that protects the lower limit number (Run Length Limited: RLL) of consecutive on/off pixels is rearranged, using a copy of known data as a protection pattern of various patterns (1504).

The finally generated two-dimensional data is output as recorded data (1505), when the predetermined number of pages set by the higher order are repeatedly output (1506), the process is terminated.

In this manner, by constituting at least three kinds of memories according to the processing unit of each processing, it is possible to perform data processing in parallel, and to perform processing at a high speed. In this example, three types of memories have been described. However, since it is possible to secure further processing time by parallelizing two or more in each memory, it is possible to easily compensate the delay of each processing, and which is similarly achieved by performing arithmetic operation processing in processing which is not shown in the drawings via storage means such as an FIFO or a memory.

In the above description, it has been described that the first and third memories which require high-speed access are an SRAM, and the second memory which handles large-capacity data is a DRAM, but each memory is not limited thereto. Any memory configuration and storage means may be used as long as it can achieve the function of high speed processing and large capacity storage. Furthermore, the three types of memories have been described as separate memories, but they can be implemented by the same memory having different memory spaces.

Moreover, the third memory 1407 is not necessarily required, and the modulated data may be recorded in an arrangement considering two-dimensional page data in the second memory. In this case, the modulated data may be recorded as an initial pattern on all page data in the second memory, or all patterns may be recorded at the time of recording the update pattern after the modulated data is recorded.

Furthermore, when only the modulated data is recorded in the second memory and the modulated data is output from the second memory 1405, by outputting a marker pattern or copy data from the pattern generating circuit 1408 switching from the time of outputting the data, it is possible to achieve similar function.

Thus, in the two-dimensional data signal generating circuit, it is possible to implement a configuration which accelerates the generation processing time based on the signal generation method as described with reference to FIGS. 1*a* to 1*d*, 10*a* to 10*b*, and 11, and to achieve both improvement of performance and acceleration while maintaining the performance of randomization.

Note that, the present invention is not limited to the above embodiments and includes various modifications. For example, the above embodiments have been described in detail to easily understand the present invention, and the present invention is not necessarily limited to the ones including all the described configurations. Furthermore, a part of the configuration of an embodiment may be replaced with a part of the configuration of another embodiment, and the configuration of an embodiment may be added to the configuration of another embodiment. Moreover, addition, deletion, and replacement of another configuration may be made in a part of the configuration of each embodiment.

Specific modifications are as follows.

As modification 1, an optical information recording device which records information in an information recording medium using holography, the optical information recording device including a signal generating unit which generates, from user data, two-dimensional data in which ON pixels and OFF pixels are arranged in a lattice shape, and a spatial light modulating unit which displays the generated two-dimensional data and spatially modulates a transmitted or reflected light beam, in which the signal generating unit divides an error correction block generated by performing error correction coding to the user data into b number of sectors (b: a natural number), each sector having a number of bits (a: a natural number), divides the sector into c number of sub-sectors (c: a natural number) and distributes bits to each of the c number of sub-sectors, randomizes arrangement order of the bits for each sub-sector to which the bits are distributed, combines the c number of sub-sectors in which the arrangement order of the bits is randomized to generate an interleaved sector, divides the interleaved sector into c/d (d: a natural number, c≠d, and c>d) and combines e number of divided interleaved sectors (e: a natural number, e≠b, and b>e) to generate a pre-modulation block, modulates the pre-modulation block by a modulation rule such that a lower limit value of the consecutive number of ON or OFF pixels arranged in a row direction among arrays of the pre-modulation block is to be f (f: a natural number) to generate a modulation string, and arranges the modulation string in a data unit of a sub-page generated by dividing predetermined page data into g (g: a natural number) and arranges a synchronization signal in a marker unit to generate the two-dimensional data, and the marker unit includes a fixed pattern indicating the synchronization signal and a copy pattern of adjacent codes of the modulation string.

As modification 2, the optical information recording device according to modification 1, in which the modulation string is obtained by modulating, based on the modulation rule having a predetermined coding rate (h/i) (h, i: natural number), each row of matrix data having a block structure of (b/e) rows×(e×a/c×d) columns obtained by combining a randomized bit string having (a/c×d) bits by e number of sectors.

As modification 3, the optical information recording device according to modification 1 or 2, in which the number of bits a and the number of divisions c in a sector are set such that (a/c) is to be an integer, and a page data region of the two-dimensional data is divided so as to be constituted by a region of a plurality of sub-pages (g/c×d) such that (c/d) is to be an integer.

As modification 4, the optical information recording device according to modification 1 or 2, in which the e number of sectors to be combined is set such that (e×h/i) is to be an integer, the sub-page has a bit size of an integral multiple of (e×h/i), and the data is arranged on each sub-page.

As modification 5, the optical information recording device according to modification 1, in which the marker unit has copy data of adjacent modulation string data of at least (f−1) bits.

As modification 6, the optical information recording device according to modification 1, in which the random-interleaved string is combined based on a rule in which a distance between adjacent bits in a bit string before randomization is sufficiently apart by at least (a/c) bits or more.

As modification 7, the optical information recording device according to any one of modifications 1, 2, and 6, in which the random-interleaved string is shifted by j number of bits (j: a natural number) in each sector in a column direction to generate a shift-interleaved string, the shift-interleaved string is combined by e number of sectors to generate an inter-sector interleaved string, the inter-sector interleaved string is divided into (c/d) to generate a quadrant-interleaved matrix, each row of the quadrant-interleaved matrix is modulated based on a predetermined modulation rule to generate a modulation string, and the modulation string is arranged in the data unit of each sub-page.

As modification 8, the optical information recording device according to modification 1, in which the page data is constituted by being divided into a plurality of g number of sub-pages each having a uniform size, the sub-pages are constituted by sub-pages having different numbers of effective data in a size of constituting data, and data of the modulation string is arranged only at a position of the data unit to be the effective data.

As modification 9, the optical information recording device according to modification 1, further including a first memory which records bit data randomized by being subjected to the error correction addition, a second memory which records modulation string data obtained by performing interleaving and modulation processing to the randomized bit data, and a third memory which records the two-dimensional data to be displayed by the spatial light modulating unit.

As modification 10, the optical information recording device according to modification 9, in which a marker pattern unit is arranged in the third memory as an initial pattern, the generated modulation string data is arranged, and the modulation string data and an update pattern are arranged, and copy data of the adjacent codes is arranged in the marker pattern unit based on a modulation rule satisfying a lower limit value f.

As modification 11, an optical information recording method which records information in an information recording medium using holography, the optical information recording method including a signal generating step of generating, from user data, two-dimensional data in which ON pixels and OFF pixels are arranged in a lattice shape, and a spatial light modulating step of displaying the generated two-dimensional data and of spatially modulating a transmitted or reflected light beam, in which in the signal generating step, an error correction block generated by performing error correction coding to the user data is divided into b number of sectors (b: a natural number), each sector having a number of bits (a: a natural number), the sector is divided into c number of sub-sectors (c: a natural number) and bits are distributed to each of the c number of sub-sectors, arrangement order of the bits is randomized for each sub-sector to which the bits are distributed, the c number of sub-sectors in which the arrangement order of the bits is randomized are combined to generate an interleaved sector, the interleaved sector is divided into c/d (d: a natural number, c≠d, and c>d) and e number of divided interleaved sectors (e: a natural number, e≠b, and b>e) are combined to generate a pre-modulation block, the pre-modulation block is modulated by a modulation rule such that a lower limit value of the consecutive number of ON or OFF pixels arranged in a row direction among arrays of the pre-modulation block is to be f (f: a natural number) to generate a modulation string, and the modulation string is arranged in a data unit of a sub-page generated by dividing predetermined page data into g (g: a natural number) and a synchronization signal is arranged in a marker unit to generate the two-dimensional data, and the marker unit includes a fixed pattern indicating the synchronization signal and a copy pattern of adjacent codes of the modulation string.

As modification 12, the optical information recording method according to modification 11, in which a marker pattern unit is arranged as an initial pattern, the generated modulation string data is arranged, and the modulation string data and an update pattern are arranged, and copy data of the adjacent codes is arranged in the marker pattern unit based on a modulation rule satisfying a lower limit value f.

Furthermore, a part of or all of the above configurations, functions, processing units, processing means, and the like may be implemented by hardware by, for example, being designed by an integrated circuit. Moreover, the above configurations, functions, and the like may be implemented by software by interpreting and running a program which implements the functions by a processor. Information for implementing the functions, such as a program, a table, and a file, may be stored in a recording device, such as a memory, a hard disk, or a solid state drive (SSD) or in a recording medium, such as an IC card, an SD card, or a DVD.

The control line and the information line necessary for description are shown, and all control lines and information lines necessary for a product are not necessarily shown. In practice, it can be considered that almost all configurations are connected mutually.

REFERENCE SIGNS LIST

101 . . . Correction-coded sector, 102 . . . ECC block, 103 . . . Sub-sector, 104 . . . Random-interleaved sector, 105 . . . Pre-modulation block, 106 . . . Sub-page, 107 . . . Data unit, 108 . . . Marker unit, 1001 . . . Interleaved sub-sector, 1002, 1302 . . . Page, 1101 . . . Block data, 1102 . . . Synchronization signal, 1201 . . . Random-interleaved block data, 1202 . . . Shift-interleaved block data, 1203 . . . Inter-sector interleaved block data, 1204 . . . Quadrant-interleaved block data

The invention claimed is:

1. An optical information recording device which records information in an information recording medium using holography, the optical information recording device comprising:
a signal generating unit configured to generate, from user data, two-dimensional data in which ON pixels and OFF pixels are arranged in a lattice shape; and
a spatial light modulating unit configured to display the generated two-dimensional data and to spatially modulate a transmitted or reflected light beam, wherein
the signal generating unit divides an error correction block generated by performing error correction coding to the user data into b number of sectors (b: a natural number), each sector having a number of bits (a: a natural number),
divides the sector into c number of sub-sectors (c: a natural number) and distributes bits to each of the c number of sub-sectors,
randomizes arrangement order of the bits for each sub-sector to which the bits are distributed,
combines the c number of sub-sectors in which the arrangement order of the bits is randomized to generate an interleaved sector,
divides the interleaved sector into c/d (d: a natural number, c≠d, and c>d) and combines e number of divided interleaved sectors (e: a natural number, e≠b, and b>e) to generate a pre-modulation block,
modulates the pre-modulation block by a modulation rule such that a lower limit value of the consecutive number of ON or OFF pixels arranged in a row direction among arrays of the pre-modulation block is to be f (f: a natural number) to generate a modulation string, and
arranges the modulation string in a data unit of a sub-page generated by dividing predetermined page data into g (g: a natural number) and arranges a synchronization signal in a marker unit to generate the two-dimensional data, and
the marker unit comprises a fixed pattern indicating the synchronization signal and a copy pattern of adjacent codes of the modulation string.

2. The optical information recording device according to claim 1, wherein the modulation string is obtained by modulating, based on the modulation rule having a predetermined coding rate (h/i) (h, i: natural number), each row of matrix data having a block structure of (b/e) rows×(e×a/c×d) columns obtained by combining a randomized bit string having (a/c×d) bits by e number of sectors.

3. The optical information recording device according to claim 1, wherein
the number of bits a and the number of divisions c in the sector are set such that (a/c) is to be an integer, and
a region of the page data of the two-dimensional data is divided so as to be constituted by a region of a plurality of sub-pages (g/c×d) such that (c/d) is to be an integer.

4. The optical information recording device according to claim 1, wherein
the e number of sectors e to be combined is set such that (e×h/i) is to be an integer,
the sub-page has a bit size of an integral multiple of (e×h/i), and
data is arranged on each sub-page.

5. The optical information recording device according to claim 1, wherein the marker unit has copy data of adjacent modulation string data of at least (f−1) bits.

6. The optical information recording device according to claim 1, wherein the random-interleaved string is combined based on a rule in which a distance between adjacent bits in a bit string before randomization is sufficiently apart by at least (a/c) bits or more.

7. The optical information recording device according to claim 1, wherein
the random-interleaved string is shifted by j number of bits (j: a natural number) in each sector in a column direction to generate a shift-interleaved string,
the shift-interleaved string is combined by e number of sectors to generate an inter-sector interleaved string,
the inter-sector interleaved string is divided into (c/d) to generate a quadrant-interleaved matrix,
each row of the quadrant-interleaved matrix is modulated based on a predetermined modulation rule to generate a modulation string, and
the modulation string is arranged in the data unit of each sub-page.

8. The optical information recording device according to claim 1, wherein
the page data is constituted by being divided into a plurality of g number of sub-pages each having a uniform size,
the sub-pages are constituted by sub-pages having different numbers of effective data in a size of constituting data, and
data of the modulation string is arranged only at a position of the data unit to be the effective data.

9. The optical information recording device according to claim 1 further comprising:
a first memory configured to record bit data randomized by being subjected to the error correction addition;
a second memory configured to record modulation string data obtained by performing interleaving and modulation processing to the randomized bit data; and a third memory configured to record the two-dimensional data to be displayed by the spatial light modulating unit.

10. The optical information recording device according to claim 9, wherein
a marker pattern unit is arranged in the third memory as an initial pattern,
the generated modulation string data is arranged, and the modulation string data and an update pattern are arranged, and
copy data of the adjacent codes is arranged in the marker pattern unit based on a modulation rule satisfying a lower limit value f.

11. An optical information recording method which records information in an information recording medium using holography, the optical information recording method comprising:
a signal generating step of generating, from user data, two-dimensional data in which ON pixels and OFF pixels are arranged in a lattice shape; and
a spatial light modulating step of displaying the generated two-dimensional data and of spatially modulating a transmitted or reflected light beam, wherein
in the signal generating step, an error correction block generated by performing error correction coding to the user data is divided into b number of sectors (b: a natural number), each sector having a number of bits (a: a natural number),
the sector is divided into c number of sub-sectors (c: a natural number) and bits are distributed to each of the c number of sub-sectors,
arrangement order of the bits is randomized for each sub-sector to which the bits are distributed,
the c number of sub-sectors in which the arrangement order of the bits is randomized are combined to generate an interleaved sector,
the interleaved sector is divided into c/d (d: a natural number, c≠d, and c>d) and e number of divided interleaved sectors (e: a natural number, e≠b, and b>e) are combined to generate a pre-modulation block,
the pre-modulation block is modulated by a modulation rule such that a lower limit value of the consecutive number of ON or OFF pixels arranged in a row direction among arrays of the pre-modulation block is to be f (f: a natural number) to generate a modulation string, and
the modulation string is arranged in a data unit of a sub-page generated by dividing predetermined page data into g (g: a natural number) and a synchronization signal is arranged in a marker unit to generate the two-dimensional data, and
the marker unit comprises a fixed pattern indicating the synchronization signal and a copy pattern of adjacent codes of the modulation string.

12. The optical information recording method according to claim 11, wherein
a marker pattern unit is arranged as an initial pattern,
the generated modulation string data is arranged, and the modulation string data and an update pattern are arranged, and
copy data of the adjacent codes is arranged in the marker pattern unit based on a modulation rule satisfying a lower limit value f.

* * * * *